No. 718,486. PATENTED JAN. 13, 1903.
J. C. LOTTERHAND.
ADDING MACHINE.
APPLICATION FILED AUG. 5, 1902.
NO MODEL. 9 SHEETS—SHEET 1.
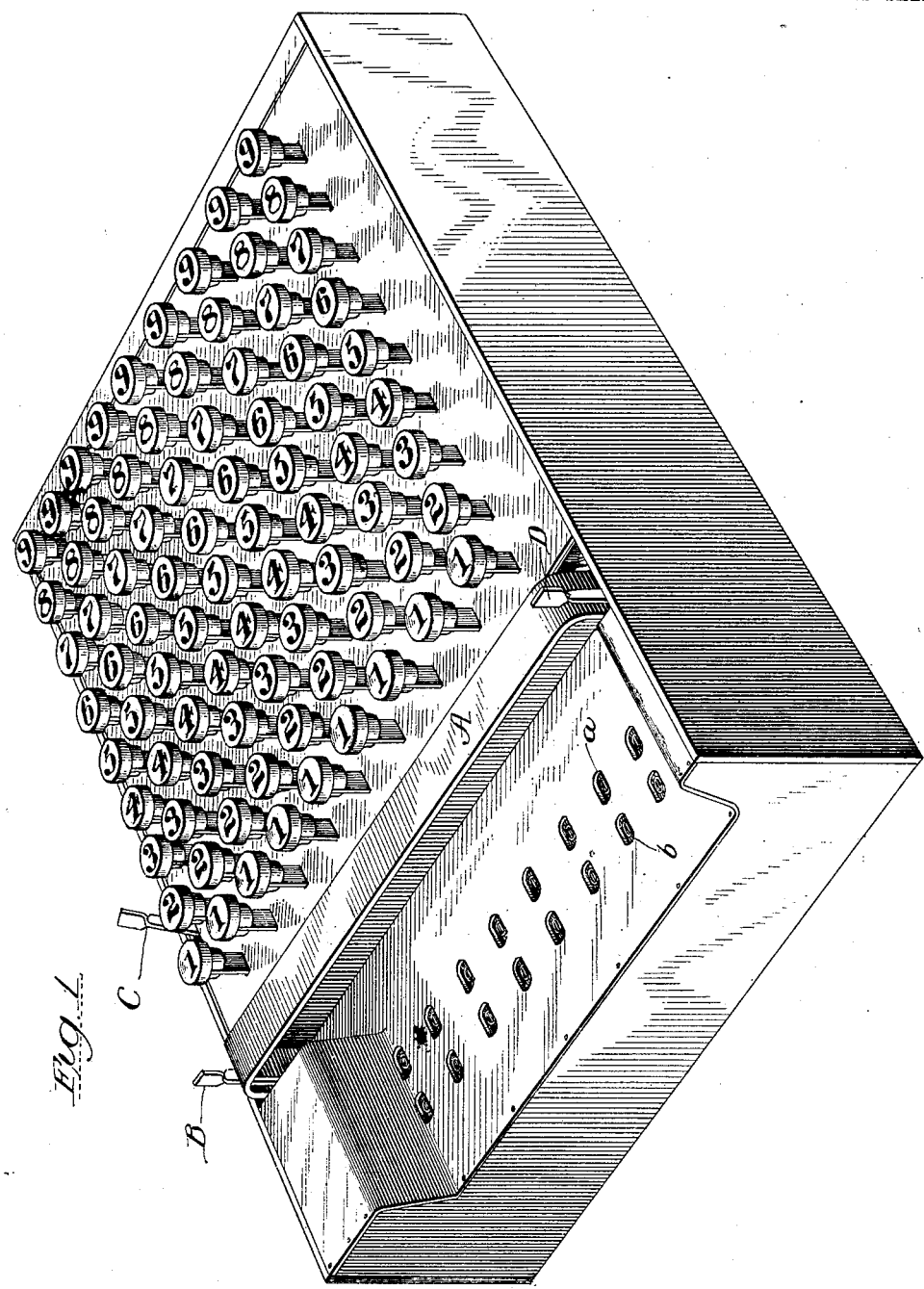

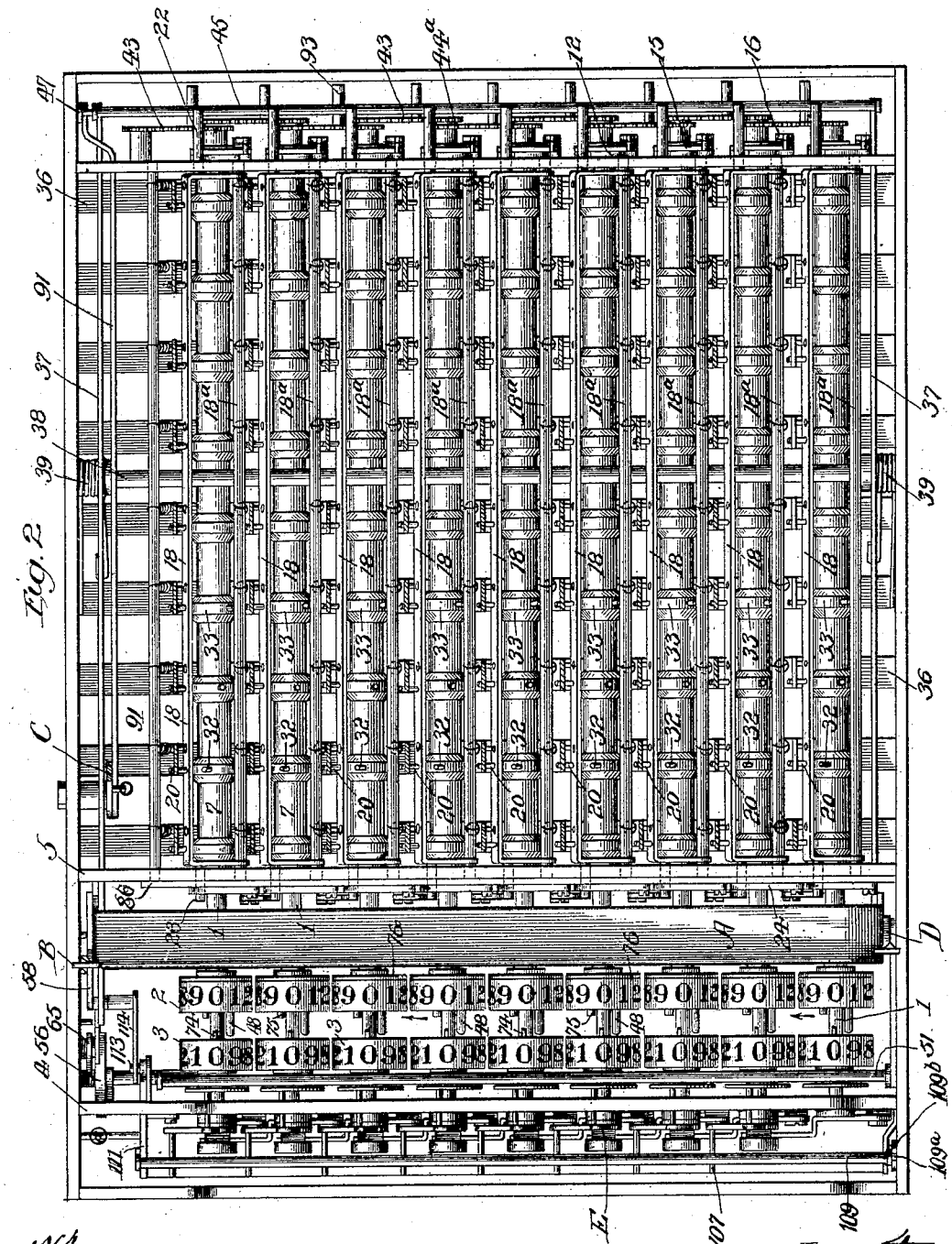

No. 718,486. PATENTED JAN. 13, 1903.
J. C. LOTTERHAND.
ADDING MACHINE.
APPLICATION FILED AUG. 5, 1902.
NO MODEL. 9 SHEETS—SHEET 3.
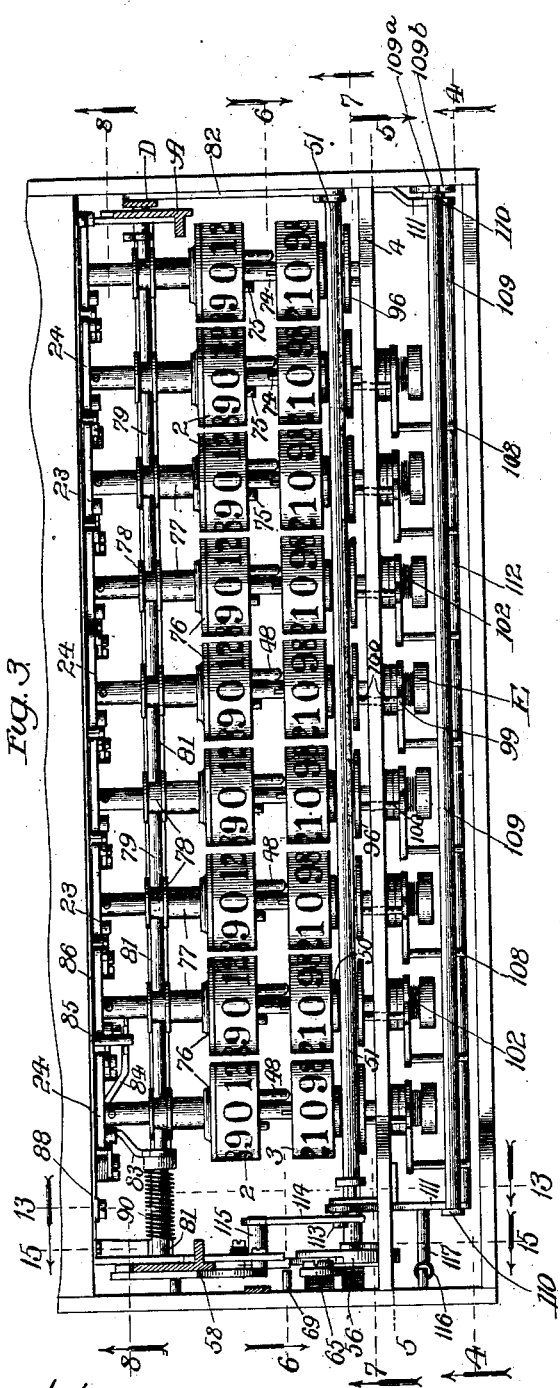
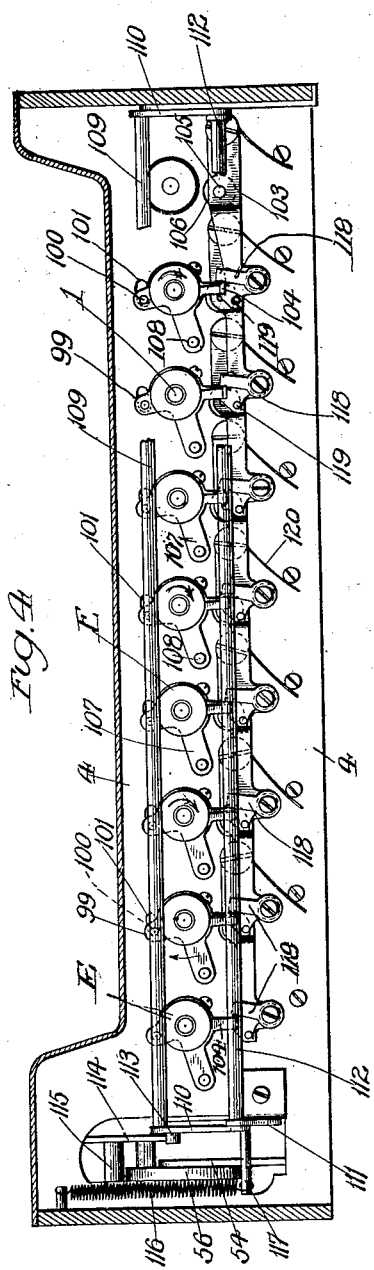
Witnesses:
Harold G. Barrett.
Louis B. Erwin.
Inventor:
Jason C. Lotterhand
By Rector & Hibben
His Attys No. 718,486. PATENTED JAN. 13, 1903.
J. C. LOTTERHAND.
ADDING MACHINE.
APPLICATION FILED AUG. 5, 1902.
NO MODEL. 9 SHEETS—SHEET 4.
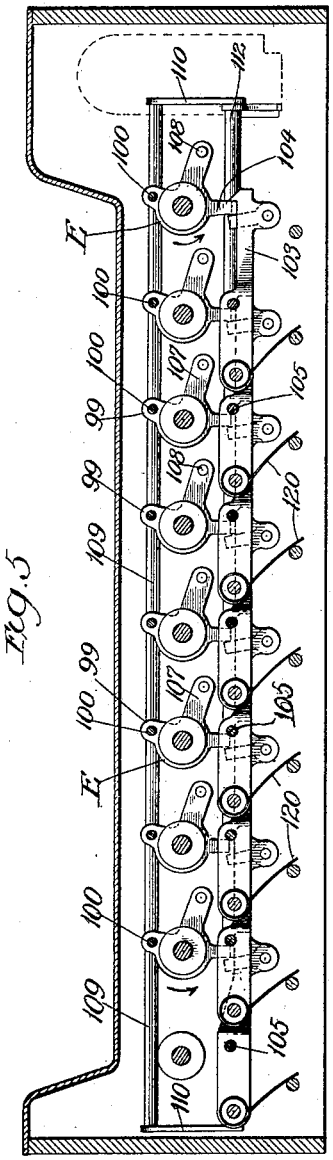
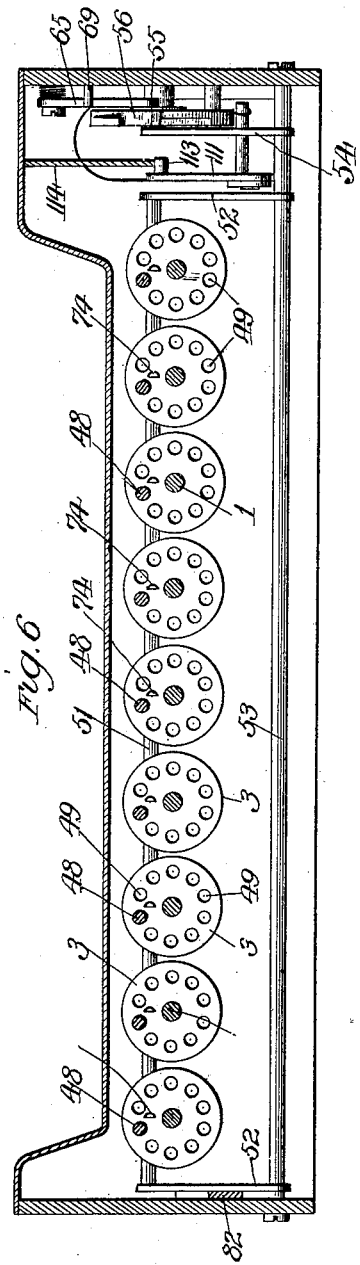

No. 718,486. PATENTED JAN. 13, 1903.
J. C. LOTTERHAND.
ADDING MACHINE.
APPLICATION FILED AUG. 5, 1902.
NO MODEL. 9 SHEETS—SHEET 5.
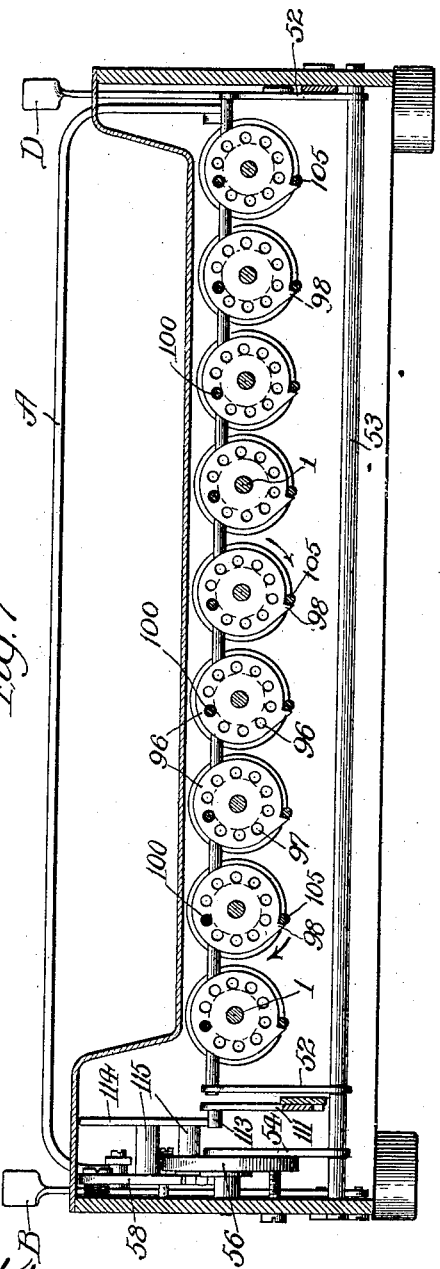
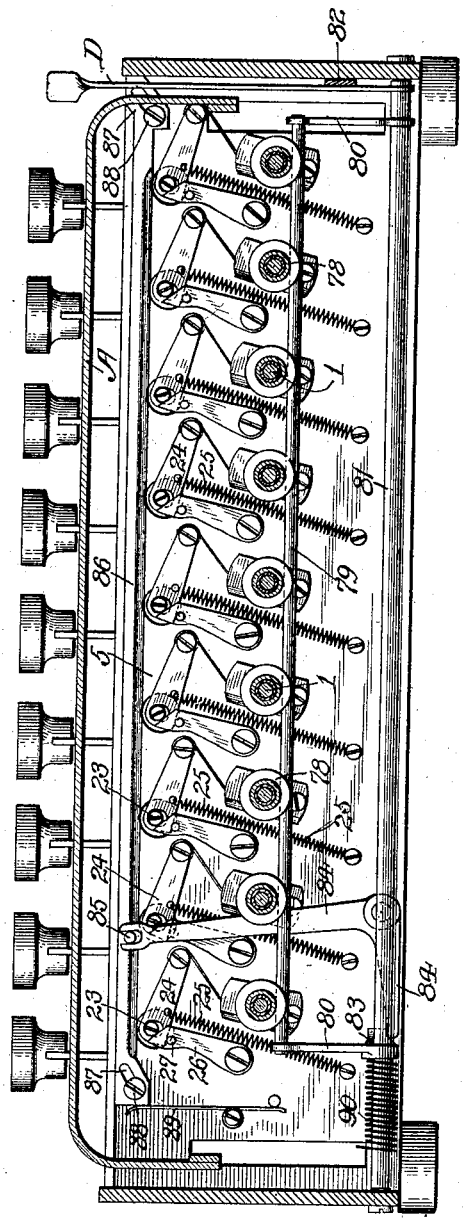

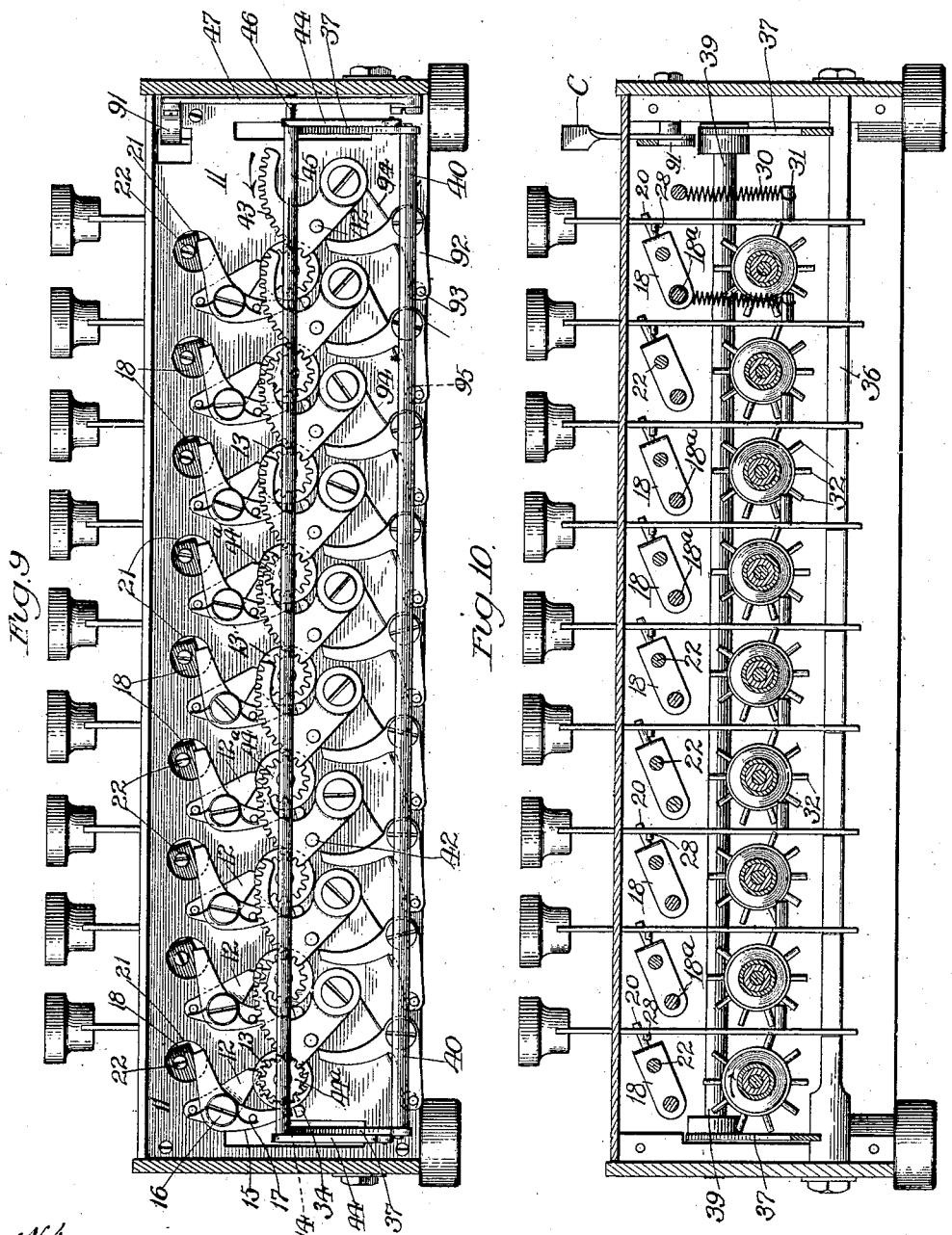

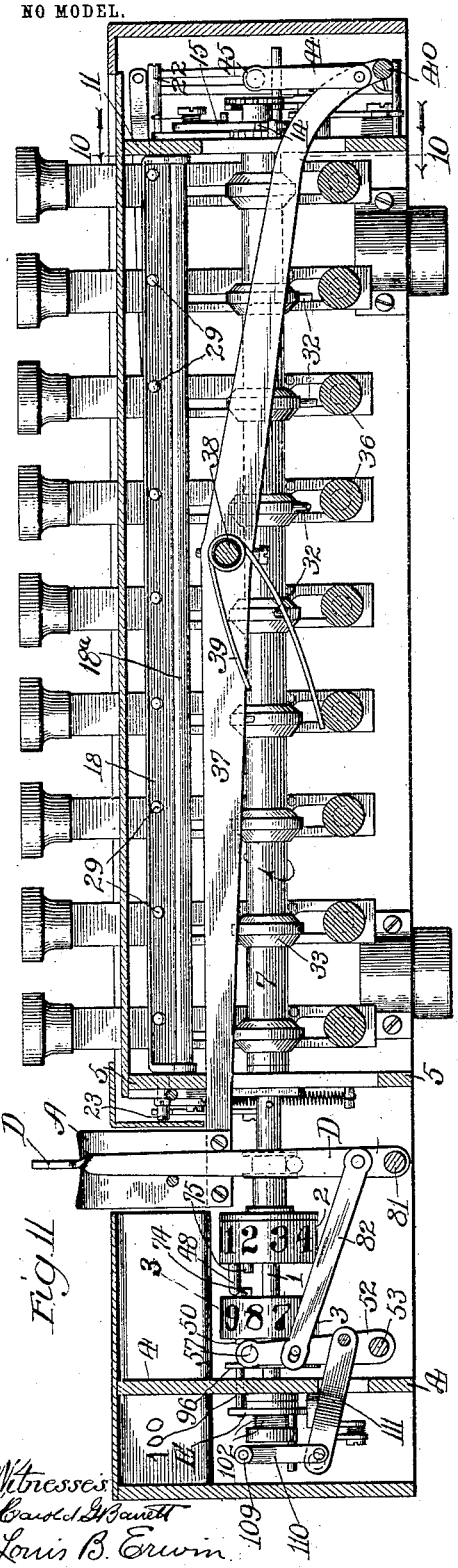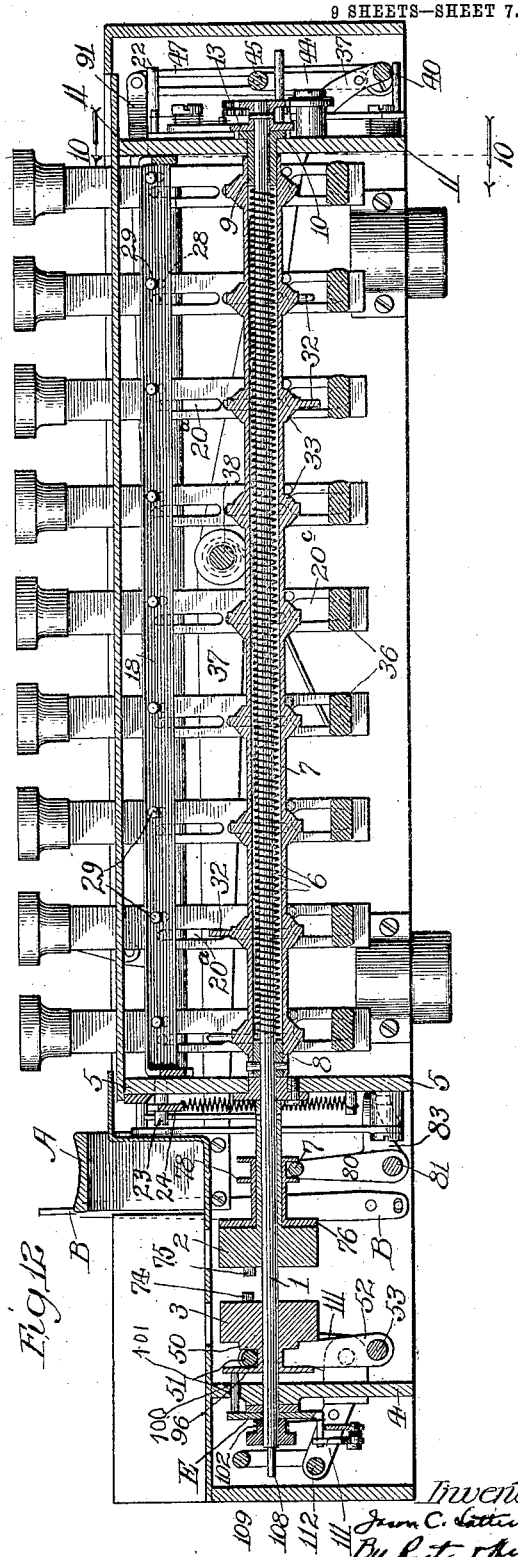

No. 718,486. PATENTED JAN. 13, 1903.
J. C. LOTTERHAND.
ADDING MACHINE.
APPLICATION FILED AUG. 5, 1902.
NO MODEL. 9 SHEETS—SHEET 8.
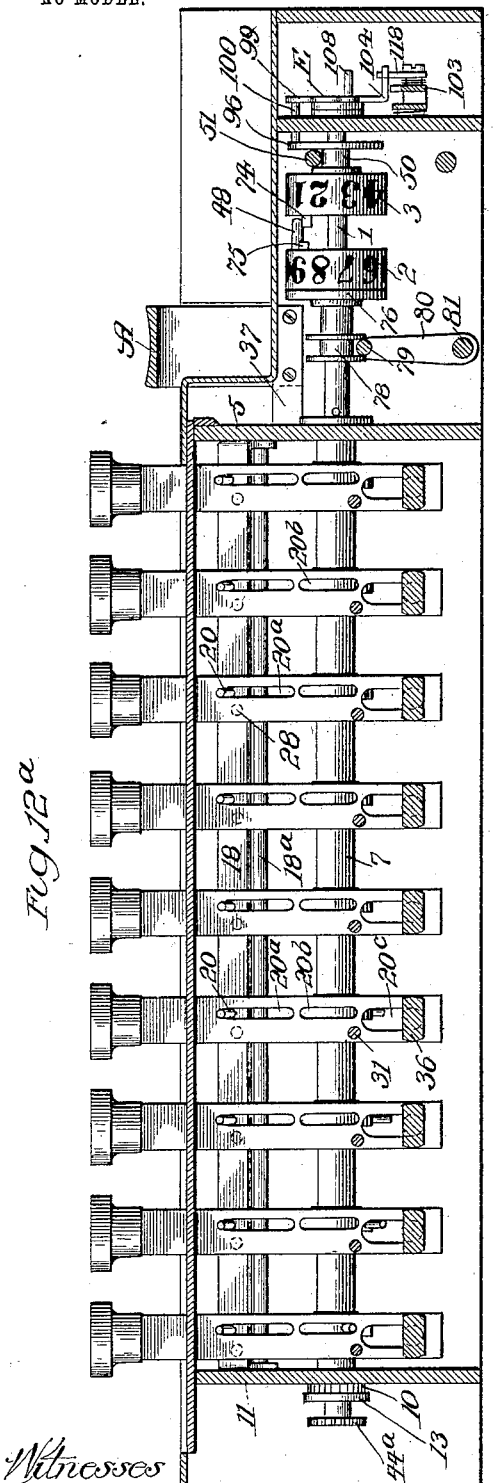
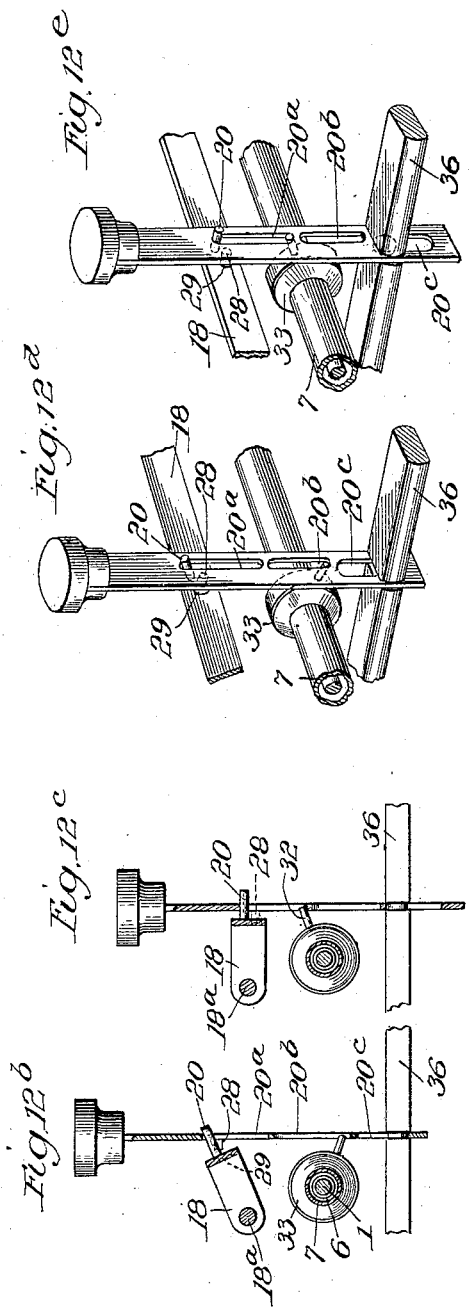

No. 718,486. PATENTED JAN. 13, 1903.
J. C. LOTTERHAND.
ADDING MACHINE.
APPLICATION FILED AUG. 5, 1902.
NO MODEL. 9 SHEETS—SHEET 9.
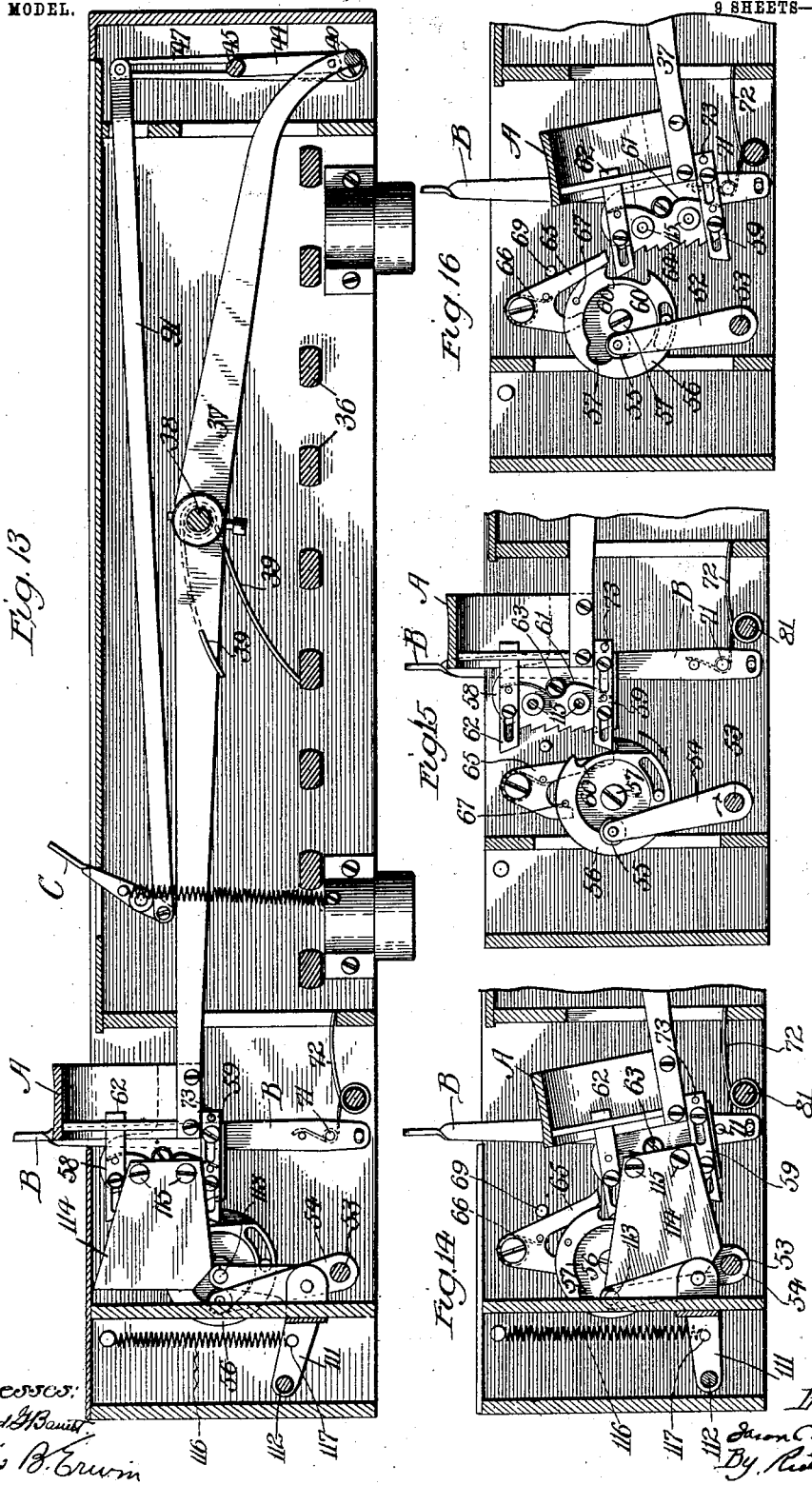

UNITED STATES PATENT OFFICE.

JASON C. LOTTERHAND, OF NEW YORK, N. Y.

ADDING-MACHINE.

SPECIFICATION forming part of Letters Patent No. 718,486, dated January 13, 1903.

Application filed August 5, 1902. Serial No. 118,420. (No model.)

*To all whom it may concern:*

Be it known that I, JASON C. LOTTERHAND, a citizen of the United States, residing at New York, in the county of New York and State of New York, have invented a certain new and useful Improvement in Adding-Machines, of which the following is a description, reference being had to the accompanying drawings, forming a part of this specification.

My invention relates, primarily, to machines for mechanically adding up individual items or amounts into an aggregate or total; and it consists in certain novel constructions, combinations, and modes of operation of the parts of such machines, whereby the simplicity and efficiency of such machines are increased, all as hereinafter set forth, and more particularly pointed out in my claims.

In the accompanying drawings, Figure 1 represents a perspective view of my machine looking at the forward right-hand corner thereof; Fig. 2, a sectional plan view of the machine; Fig. 3, an enlarged detail top plan view of the parts at the front of the machine in Fig. 2, with the operating-bar cut away to expose the parts beneath it; Fig. 4, a vertical cross-section immediately in rear of the front plate of the casing; Fig. 5, a transverse section approximately on the line 5 5 of Fig. 3 looking forward, being a rear view of the parts shown in front elevation in Fig. 4; Fig. 6, a transverse section approximately on the line 6 6 of Fig. 3 looking forward; Fig. 7, a transverse section approximately on the line 7 7 of Fig. 3 looking rearward; Fig. 8, a transverse section approximately on the line 8 8 of Fig. 3 looking rearward; Fig. 9, a vertical cross-section at the rear of the machine looking forward; Fig. 10, a cross-section of the machine approximately on the line 10 10 of Figs. 11 and 12 looking forward; Fig. 11, a longitudinal vertical section immediately within the right-hand side plate of the machine looking toward the left; Fig. 12, an approximately middle longitudinal vertical section of the machine looking toward the left; Fig. 12$^a$, a longitudinal vertical section immediately beyond the row of keys shown in Fig. 12 and looking toward the right instead of the left, some of the parts shown in Fig. 12 being omitted in Fig. 12$^a$ to simplify the view; Fig. 12$^b$, a cross-sectional detail of one of the keys and its coöperating bail and shaft with the parts in normal position; Fig. 12$^c$, a corresponding view with the key depressed; Figs. 12$^d$ and 12$^e$, perspective details of the parts shown in Figs. 12$^b$ and 12$^c$ in corresponding positions; Fig. 13, a longitudinal vertical section approximately on the line 13 13 of Fig. 3 looking toward the left; Fig. 14, a detail of the parts shown at the front end of Fig. 13 in the position they occupy when the operating-bar is depressed; Fig. 15, a longitudinal vertical sectional detail approximately on the line 15 15 of Fig. 3; and Fig. 16, a view corresponding to Fig. 15, with the parts in the position they occupy when the operating-bar is depressed.

The same characters of reference are used to indicate corresponding parts in the several views.

Before explaining in detail the mechanism of the machine and to facilitate an explanation of the same the general nature and mode of operation of the machine may be briefly stated as follows: The machine employs a plurality of rows of keys extending longitudinally of the machine, Fig. 1, there being nine keys in each row, numbered from "1" to "9." The capacity of the machine is determined by the number of rows of keys, the first row at the right indicating units from "1" to "9," the second tens, the third hundreds, and so on from right to left. In the present instance I have shown my machine provided with nine rows of keys, which gives it a capacity for adding any item or amount from one cent to nine million nine hundred and ninety-nine thousand nine hundred and ninety-nine dollars and ninety-nine cents; but the same construction is employed and the same mode of operation carried out whatever be the number of rows of keys and consequent capacity of the machine.

Each longitudinal row of keys coöperates with a rotary or oscillatory shaft extending longitudinally of the machine beside such row of keys and carrying near its front end a numbered wheel exposed to view at a sight-opening $a$ in the top plate of the front end of the machine in such manner that when any key is depressed such shaft will turn the wheel to position to expose to view at said sight-opening the number represented by the operated key. After a wheel has thus been set by the depression of a key it may be returned to initial or zero position by the depression of an operating-bar A, extending transversely across the machine in front of the keys. The depression of this bar not only serves to return the wheel to initial position, but it engages or connects such wheel prior to returning it to initial position with another similar wheel located immediately in front of the first-mentioned wheel upon the same axis and adapted to have its numbers exposed to view through a sight-opening b. The result of this is that when the first-mentioned wheel is returned to initial position it carries the second wheel around with it, and thereby advances the second wheel as far as the first wheel was turned from initial position at the depression of the key.

The first-mentioned or rearward set of wheels, having their numbers exposable at the rear row of sight-openings a, constitute the item or indicating wheels, while the second or forward row of wheels, having their numbers exposable at the forward row of sight-openings b, constitute the cumulating or totalizing wheels. As will be understood, the operation of the machine consists in depressing the keys which represent the item or amount to be added, which will cause such item or amount to be set up on the rear set of wheels, and then depressing the operating-bar A, which will cause said wheels to be returned to initial position and in the act of returning to carry the corresponding wheels of the forward set with them, and thereby add the amount of the item upon the latter set of wheels. The depression of the operating-bar also serves to restore the depressed keys to normal position ready for the next succeeding operation.

If it be discovered after the keys have been depressed and the item set up on the rear set of wheels that an error has been made in setting up the item, it may be corrected and the keys returned to initial position without adding the item upon the totalizing-wheels by simply pressing rearward a lever B at the left side of the machine and holding it in rearward position while the operating-bar A is depressed. The depression of said bar will return the item-wheels to zero, while the lever B will serve to prevent engagement of the item-wheels with the totalizing-wheels and leave the latter unaffected by the return of the item-wheels, thus permitting the correction of the error before it has been transmitted to the totalizing-wheels.

When it is desired to "repeat" or add the same item or amount a number of times in succession, a lever C at the left side of the machine is pulled forward, with the result that the depression of the operating-bar will then not return the depressed keys to initial position, so that successive depressions of the bar will cause the amount represented by the depressed keys to be added upon the totalizing-wheels as many times as said bar is depressed.

When it is desired to "clear" the machine or return the totalizing-wheels to zero, this may be accomplished by pressing rearward a lever D at the right side of the machine, then pressing rearward the lever B at the left side of the machine, and then, while the lever B is held rearward, depressing the operating-bar A. The pressing rearward of the lever D causes all of the item-wheels to turn forward nine-tenths of a revolution and expose their figures "9" at the sight-openings a, and during this movement the item-wheels will pick up the corresponding totalizing-wheels, whatever be their position, and carry them to zero. If the operating-bar A were then depressed, the item-wheels would be engaged or connected with the totalizing-wheels and upon returning to initial position would simply add nine upon each totalizing-wheel, as in the ordinary operation of the machine above described; but by pressing rearward the lever B prior to depressing the bar A the engagement or connection of the item-wheels with the totalizing-wheels at the depression of the operating-bar is prevented, with the result that the item-wheels are turned back to zero by the depression of the bar and the totalizing-wheels left standing at zero. The pressing rearward of the lever D thus turns all of the totalizing-wheels to zero, while the manipulation of the lever B permits them to remain there when the operating-bar is depressed and the item-wheels thereby returned to zero, and thus the machine is cleared whenever desired.

Having now indicated the general nature and mode of operation of the machine, I will proceed to an explanation of it in detail.

The shafts 1, heretofore referred to, which carry the item or indicating wheels 2, extend from front to rear of the machine, as best shown in Figs. 2, 11, and 12, having their forward bearings in cross-plates 4 and 5 and their rearward bearings in a cross-plate 11. The item-wheels 2 are fast upon the shafts 1, while the totalizing-wheels 3 are loosely mounted upon said shafts immediately in front of the wheels 2. Each shaft 1 is surrounded by a coiled spring 6, Fig. 12, which is secured at one end to the shaft and at its opposite end to a fixed point. These springs tend to turn the shafts 1 from right to left looking down upon the top of the shafts, Figs. 2 and 3, and consequently to advance the item-wheels 2 from zero or initial position when the shafts are released and permitted to turn. In the present instance the springs 6, surrounding the shafts 1, are inclosed in tubular casings 7. At their front ends these tubular casings are secured to the shafts 1, spacing-collars 8 being interposed between the shafts and casings and both pinned to the shaft, Fig. 12. At their rear ends the casings 7 fit upon and are supported by the forwardly-extended hubs 9 of ratchets 10, said hubs having bearings in the crossplate 11, against whose rear face the ratchets 10 fit, Fig. 12. The front ends of the springs 6 are secured to the shafts 1 by being straightened out parallel with the shafts and inserted in holes in the collars 8, as indicated by the dotted lines in Fig. 12, while the rear ends of said springs are similarly shaped and inserted in holes in the hubs 9 of the ratchets 10. The ratchets 10 are held from turning in a backward direction under the stress of the springs 6 by retaining-pawls 12, Fig. 9, pivoted to the rear face of the plate 11 and engaging the ratchets at their lower ends. The pawls serve to hold the ratchets, and consequently the rear ends of the springs 6, in fixed position, but at the same time permit the tension of the springs to be adjusted as desired by turning the ratchets in one direction or the other.

It will be understood that the shafts 1 turn freely in the bearings formed for them in the hubs 9 of the ratchets, Fig. 12, while immediately in rear of the ratchets each shaft has fast upon it a disk 13, Figs. 9, 11, and 12, provided upon its periphery with a lug or tooth 14, with which coöperates a spring-latch 15 in the form of a lever pivoted to the rear side of the cross-plate 11 at the point 16, the retaining-pawls 12, heretofore referred to, being mounted upon the same pivots. A single spring 17, coiled around the pivot 16 and engaging at one end a pin upon the upper end of the pawl 12 and at its opposite end a pin upon the lower arm of the latch-lever 15, serves in the present instance to press the lower end of the pawl 12 against the ratchet and the lower end of the latch-lever 15 against the periphery of the disk 13. When the lower end of the latch-lever 15 is swung away from the disk 13 and disengaged from the lug 14 thereon, the shaft 1 is left free to be turned by the coiled spring surrounding it and will be so turned until arrested in the manner hereinafter explained. The latch 15 is disengaged from the lug upon the disk 13 and the shaft thereby released, when any key in the row corresponding to the shaft is depressed by the following means: Pivotally supported within the casing of the machine and extending lengthwise of the several rows of keys are a plurality of bails 18, Figs. 2, 9, 10, 11, 12, and 12$^a$ to 12$^e$, said bails being hung at their opposite ends upon rods 18$^a$, secured at their front and rear ends in the cross-plates 5 and 11, Figs. 2 and 12$^a$. There is one bail associated with each row of keys, Fig. 2, the supporting end arms of the bail being pivoted at their ends remote from the keys, while the longitudinal portions of the bails are adapted to swing downward and upward in close proximity to the keys, Fig. 10. Each bail is provided with nine pins 20, Figs. 2 and 12$^a$, one for each key in the row with which the bail is associated, and these pins project toward and through vertical slots in the corresponding keys, Figs. 2, 10, 11, 12 and 12$^a$ to 12$^e$, so that whenever any key in any row is depressed the bail will be swung downward, the slots in the keys being of sufficient length to permit such downward movement of a bail at the depression of one key in the row without causing it to carry down the other keys in such row. Secured to the rear ends of the bails and projecting rearwardly therefrom through holes 21 in the cross-plate 11 are pins 22, Figs. 2, 9, and 10, whose rear ends overlie the horizontal arms of the latch-levers 15, Fig. 9, with the result that when a key in any row is depressed and the corresponding bail 18 thereby swung downward the pin 22, carried by such bail, will contact with the arm of the latch-lever and rock it upon its pivot 16 and swing its lower end away from the disk 13 and disengage it from the lug 14 thereon, thus releasing the shaft 1, to which such disk is secured, and permitting it to be turned by the coiled spring 6, surrounding it. When the shaft is returned to initial position by the means hereinafter described, the lug 14 upon the disk 13 will ride under and become reëngaged with the lower end of the latch-lever 15 and hold the shaft in such position.

At their forward ends the bails 18 are provided with forwardly-projecting pins 23, Figs. 2, 3, 8, 11, and 12, which extend through enlarged openings in the cross-plate 5, Fig. 8, and also through elongated holes in the outer ends of arms 24, pivoted at their opposite or inner ends to the forward side of said plate. Coiled springs 25, connected to the arms 24 near their outer ends, tend to swing them downward and to cause their engagement with the pins 23, projecting from the bails 18, to swing the latter downward with them; but the arms 24 are normally held in upper position against the stress of the springs 25 by latches 26, pivoted at their lower ends to the cross-plate 5 and provided near their upper ends with rearwardly-projecting pins 27, adapted to catch under the outer ends of the arms 24 and support them. The extreme upper ends of the latch-arms 26 are beveled off and lie immediately beneath the pins 23, projecting from the bails 18 through the elongated holes in the arms 24, Fig. 8, with the result that when any bail is depressed and its pin 23 thereby moved downward the pin will ride over the beveled end of the latch and force its upper end outward, thereby disengaging its pin 27 from the arm 24 and permitting the spring 25 to pull the arm 24 downward to the limit of movement permitted the bail. The elongated opening in the arm 24, through which the pin 23 projects, permits sufficient movement of the pin independently of the arm to thus disengage the latch-pin 27 from the arm and release the latter before the pin 23 contacts with the lower wall of the opening in the arm. When the bails are all raised to normal position again by the means hereinafter described, the pins 23 will lift the arms 24 and permit the latch-pins 27 to catch under said arms again and support them in normal position ready for the next operation.

As shown in Figs. 2, 10, 11, 12, and 12$^a$ to 12$^e$, each of the keys is provided, adjacent the upper end of the vertical slot through which the pin 20 on the bail 18 projects, with a stud or pin 28, projecting toward the bail, and the bail itself is provided with a recess or hole 29, adapted to receive the pin 28 as the key and bail are depressed, and thereby lock or connect them together, so that further downward movement of the bail will carry the key with it even if pressure upon the upper end of the key be removed. It results from this that when any key is depressed far enough to cause the pin 23, projecting from the front end of the bail 18 associated with it, to disengage the latch 26 from the arm 24, Fig. 8, and permit the spring 25 to act the latter spring will carry the bail on downward to its limit of movement, and by reason of the connection of the bail and key by means of the pin 28 and hole 29 the key will be carried downward with the bail. Each key is provided with a resetting-spring 30, Fig. 10, connected at its lower end to a pin 31, projecting from the key, and at its upper end to a fixed point, in this instance the rods 18$^a$ upon which the bails 18 are hung. The initial depression of the keys is effected against the resistance of these springs; but the springs 25 at the front of the machine are of greater strength or tension than the springs 30, so that when any key has been depressed far enough to permit the corresponding spring 25 to act in the manner explained the key will be carried on downward by the bail 18 associated with it, regardless of the resistance offered by the spring 30 and regardless of the presence or absence of any pressure upon the upper end of the key. The operator may press the key downward to its limit of movement with his finger, regardless of the action of the spring 25; but the employment of the springs 25 in the manner explained serves to insure the full downward movement of a key at every partial depression of it by the operator and gives the keys a delicacy of "touch" which greatly facilitates operation of the machine and relieves the operator of much care and labor in setting the keys. When the arms 24 are swung upward and latched in initial position at the end of each operation of the machine, the key-springs 30 are left free to act and promptly lift the keys to normal position.

As heretofore explained, the depression of a key in any row trips the latch 15 which holds in check the shaft 1 associated with such row of keys and permits the spring 6, coiled about such shaft, to turn it in the direction indicated by the arrows in Figs. 2, 3, 9, 10, and 11. The extent to which the spring is permitted to turn the shaft is determined by the particular key operated in the manner and by the means to be now explained. Each shaft is provided with a spiral row of nine radially-projecting pins 32, Figs. 2, 10, 11, and 12, which in the present instance are carried by and project from the tubular portion or casing 7 of the shaft instead of directly from the shaft, and said casing is provided with annular enlargements or hubs 33 to afford a better bearing and support for the pins. The mode of operation and general result would be the same if the tubular casings 7 were omitted and the pins 32 projected directly from the shaft; but the employment of the casings is advantageous in that it permits a single spring of great length to be coiled around the shaft, whose tension is varied but slightly by a single revolution of the shaft, and which therefore always acts upon the shaft with substantially the same force no matter what degree of movement is given the shaft. The provision of the tubular casing not only facilitates the employment of such a spring, but protects it from dirt.

The vertical slots 20$^a$ in the key-stems, whose upper ends engage the pins 20 upon the bails 18 when the keys are depressed, are of such length, Figs. 11, 12, and 12$^a$ to 12$^e$, that when any key is depressed its lower end will stand in approximately the horizontal plane of the shaft 1, Fig. 12$^c$ and 12$^e$, and the lower ends of these slots coöperate with the pins 32 and form stops therefor to arrest the movement of the shaft. Thus, referring to Fig. 10, when any key is depressed the corresponding shaft will be released and turned in the direction of the arrows by its spring until its particular pin 32 which stands opposite such key enters the slot in the key and comes into contact with the lower end thereof, as shown in Figs. 12$^c$ and 12$^e$. In the present instance the keys in each row are numbered from "1" to "9," reading from front to rear of the machine, and the spiral arrangement of the pins 32 upon the shaft is such that the pin opposite the units-key near the front end of the shaft is one step removed from such key or from the bottom of the slot therein which constitutes a stop or abutment for the pin, while the pin opposite the next key is two steps removed, the pin opposite the third key three steps removed, and so on to the last or rearmost pin on the shaft opposite the "9" key, which is nine steps removed from the stop with which it coöperates, Figs. 12$^b$ and 12$^d$, so that upon depressing the "9" key the shaft will make nine-tenths of a revolution before being arrested in the position shown in Figs. 12$^c$ and 12$^e$. In this manner and by these means when a key in any row is depressed the corresponding shaft will be turned as many tenths of a revolution as there are units in the value of such key, and the corresponding number upon the item-wheel 2, carried by the front end of the shaft, will be brought beneath the sight-opening $a$ at the front of the casing, Fig. 1.

For a purpose hereinafter explained there is provided a fixed stop for each shaft to arrest it when it has completed nine-tenths of a revolution, which stops are independent of and in addition to the stops supplied to the series of keys representing "9." These stops are shown in Fig. 9 and consist in the present instance of pins 34, projecting rearwardly from the cross-plate 11 beneath the lugs 14 upon the disks 13, carried by the shafts 1. When any shaft is released by the tripping of its latch 15, it will, if not otherwise arrested, make nine-tenths of a revolution and be arrested by the lug 14 of the disk 13 coming into contact with the under side of the stop-pin 34. Owing to the provision of these supplemental stops it is not essential that the shafts 1 should be provided with pins 32 corresponding to the keys representing "9," as the supplemental stops 34 serve the same purpose as the coöperation of the pins with the stops on said keys; but in the present instance I have provided each shaft with nine pins, so that the supplemental stops 34 are not essential to the operation of keys and shafts above described and are employed only for a purpose hereinafter explained.

As shown in Figs. 11, 12, and $12^a$ to $12^e$, the key-stems are provided with a second series of slots $20^b$ immediately beneath the slots $20^a$, the purpose of the slots $20^b$ being merely to provide clearance for the pins 32 of the shafts at the right of the keys, as will be apparent from Fig. 10, (at the left of the keys in said view,) and having nothing to do with the operation which has been described. Beneath the slots $20^b$ the key-stems are provided with wider slots $20^c$, by which their lower ends are guided upon rods 36, Figs. 11 and 12 to $12^e$. These rods have flat sides and are of a thickness corresponding to the width of the slots $20^c$, so that when turned to vertical position they may be slid sidewise through the slots $20^c$ in the transverse rows of keys. Each rod 36 is provided upon its opposite sides and at right angles to its two flattened sides with slots which permit the rod to be turned to horizontal position, thereby locking the key-stems from lateral movement and providing vertical guides for them. The upper portions of the key-stems are guided in the top plate of the casing. By turning the flattened rods 36 to vertical position they may be withdrawn laterally from the rows of keys to permit the removal of the latter, while in assembling the machine they are inserted in the same position and then turned to horizontal position, as shown.

Having now described the manner in which and the means by which the depression of any key in a row causes the adjacent shaft to be turned a distance corresponding to the value of such key and to expose to view the number upon its item-wheel representing such value, I will next describe the means by which the shaft and wheel are returned to initial position and whereby during such return the item-wheel 2 carries the corresponding totalizing-wheel 3 with it and adds upon the latter the amount represented by the operated key. This is all accomplished, in the manner hereinafter explained, by depressing the operating-bar A. The opposite ends of this bar A are bent downward, as shown in Figs. 11, 12, and 13, secured to the front ends of a pair of levers 37, which extend from front to rear of the machine, and are fulcrumed near their middle upon the shaft 38. A spring 39, coiled around the shaft 38 and having one end engaging the lever 37 and its opposite end connected to or bearing against a fixed point, yieldingly holds the front ends of the levers and the operating-bar A in upper position and returns them thereto when depressed and released.

As shown in Figs. 9, 11, 12, and 13, the extreme rear ends of the levers 37 are connected by a rod 40, which rod will be swung upward at each depression of the operating-bar A, carried by the front ends of the levers, and this rod 40 coöperates with pins 42, projecting from the rear sides of sector-shaped racks 43, which are pivoted to the rear face of cross-plate 11 and mesh with pinions $44^a$, fast upon the rear ends of the shafts 1, in rear of the disks 13, heretofore described, Fig. 9. When a key in any row is depressed and the corresponding shaft turned in the direction of the arrows in Fig. 9, the rack 43, meshing with the pinion upon such shaft, will be swung downward a corresponding distance, thereby carrying its pin 42 downward into the path of upward movement of the rod 40. When the operating-bar A is thereafter depressed and the rod 40 lifted, the rod will contact with such pin 42 and restore the rack to normal position, thereby returning the shaft to its normal position and causing the lug 14 on its disk 13 to be reëngaged by the latch 15. As will be understood, therefore, when keys in several rows are depressed the corresponding racks 43 will drop distances proportional to the values of such keys, and when the operating-bar A is thereafter depressed the racks will be returned to normal position with the result stated. To relieve friction between the rod 40 and the pins 42, the rod is journaled at its opposite ends in the rear end of the levers 37, so as to turn freely therein.

The depression of the operating-bar A and elevation of the rear ends of the levers 37 also serves to lift the depressed bails 18 to normal position and thereby release the depressed keys and permit their resetting-springs 30 to return them to normal position. To this end the levers 37 have pivoted to their outer sides, near their rear ends, vertically-extending arms 44, Figs. 9, 11, 12, and 13, whose upper ends are connected by a transverse rod 45. At its left-hand end (right-hand end, Fig. 9) the rod 45 is extended beyond the arm 44 to form a pin 46, (or the arm itself is provided with a stud or pin,) which pin projects into a vertical slot in an arm 47, pivoted at its lower end to the side plate of the casing and normally held in vertical position, Fig. 13.

The engagement of the pin 46 with the vertical slot in the arm 47 serves to guide the rod 45 vertically when the cross-bar A is depressed and the rear end of the levers 37 swung upward. As shown in Figs. 11 and 12, the pins 22, which project rearward from the rear ends of the bails 18 and operate the latches 15 when the bails are depressed by the operations of the keys, also project on rearward over the rod 45, with the result that whenever the operating-bar A is depressed and the rod 45 thereby lifted said rod will contact with the pins 22 of all of the bails 18 which have been depressed and lift said bails to normal position, thereby releasing the depressed keys and permitting their springs to restore them to normal position.

So far as the mere lifting of the bails and resetting of the operated keys at each depression of the operating-bar is concerned, the rod 45 might be rigidly carried by the rear ends of the levers 37, its supporting-arms 44 being rigidly secured to or formed integral with the levers, for instance; but for the purpose of throwing this bail and key-resetting rod out of operation at will, for the purpose hereinafter described, its supporting-arms are pivoted to the levers 37 and the rod 45 is guided in the vertical slot in the arm 47, which is pivoted at its lower end and is free to be swung rearward at its upper end. When swung rearward, it will carry the rod 45 with it, so that in such position the rod 45 will travel upward in rear of the pins 22 at the depression of the operating-bar A and not contact with said pins, and consequently not reset the bails and depressed keys.

Coming now to a description of the totalizing-wheels 3 and the means for connecting them with and disconnecting them from the item-wheels 2, so as to cause the item-wheels to carry the totalizing-wheels with them during their movement in one direction, each item-wheel 2 has projecting from its forward face a pin 48, Figs. 2, 3, 11, and 12$^a$, and each totalizing-wheel 3 is provided in its rear face with a series of ten equidistant holes 49, as shown in Fig. 6, which is a rear view of said wheels. The totalizing-wheels 3 are free to both turn upon and slide longitudinally of the shafts 1, and each wheel has secured to or formed integral with its forward side a circumferentially-grooved hub or collar 50, Figs. 2, 3, 6, 11, 12, and 12$^a$, which grooved collars are engaged by the rod 51 of a swinging bail composed of said rod and a pair of vertical side arms 52, which are secured at their lower ends to a rock-shaft 53, journaled at its opposite ends in the side plates of the casing. This bail is shown most clearly in Fig. 6, which is a rear view of the parts. When the rod 51 of this bail is swung rearward, the totalizing-wheels 3 will be carried rearward with it and their holes 49 engaged with the pins 48 of the item-wheels 2, and when the bail is swung forward the totalizing-wheels will be returned to initial position and disengaged from the item-wheels. Near its left-hand end (right-hand end, Fig. 6) the rock-shaft 53 has secured to and projecting vertically from it an arm 54, Figs. 6, 13, 14, 15, and 16, which carries at its upper end an antifriction-roller 55, which coöperates with an internal cam formed upon a disk or wheel 56, which turns upon a stud-pivot 57 on the side plate of the casing. The internal cam consists of a circle provided with an offset 57, in which the roller 55 upon the upper end of the arm 54 normally rests, Fig. 15. When, however, the cam-disk is turned in the direction of the arrow from the position shown in Fig. 15 to that shown in Fig. 16, the offset 57 will be carried away from the roller 55 and the latter and the upper end of the arm 52 be forced rearward, as shown, with the result that the shaft 53 will be rocked and the bail-rod 51 be swung rearward and all of the totalizing-wheels be carried into engagement with the pins of the item-wheels. The cam-disk 56 is turned from the position of Fig. 15 to that of Fig. 16 by the depression of the operating-bar A, which bar carries at its left-hand side a forwardly-projecting plate 58, Figs. 2, 3, and 13 to 16, upon which is mounted a backwardly and forwardly sliding pawl 59, whose forward end normally engages the lower wall of a recess 60, formed in the rear side of the disk 56, Fig. 15. This pawl is mounted by slots and pins upon the plate 58 and pressed forward by a spring 61. A similar pawl 62 is similarly mounted upon the upper end of the plate 58 and pressed forward by the upper end of the spring 61, the latter being coiled at its middle around a stud 63 upon the plate 58. When the operating-bar A is depressed, the lower pawl 59 turns the disk 56 from the position of Fig. 15 to that shown in Fig. 16, and in such movement of the parts the beveled end of the upper pawl 62 rides over the rear side of the disk, is pressed backward until it clears the upper wall of the recess 60, and then springs forward beneath said wall, so that upon the release and return upward movement of the operating-bar A the pawl 62 will restore the disk 56 to normal position. At the latter movement of the parts the lower pawl 59 rides upward over the periphery of the disk and is pressed rearward until it clears the lower wall of the recess 60 and then springs forward over said wall to normal position.

In the manner and by the means above described the disk 56 is turned in one direction at the depression of the operating-bar A and in the opposite direction at its return to normal position. The totalizing-wheels are thrown rearward into engagement with the item-wheels at the beginning of the downward movement of the operating-bar before the resetting-rod 40 at the rear of the machine, Fig. 9, contacts with the pins 42 upon the racks 43 and begins to return the shafts and item-wheels to initial position, whereby the totalizing-wheels will be carried with the item-wheels during such return movement of the latter, as before stated.

For the purpose of insuring a complete downstroke of the operating-bar A the plate 58 is provided upon its forward edge with a series of teeth or serrations 64, with which coöperates a spring-pressed pawl 65, pivoted at its upper end to the side plate of the casing. A spring 66, coiled around the pivot of this pawl, tends to swing it rearward from the position of Fig. 15 to that of Fig. 16; but a pin 67 upon the disk 56 bears against the short arm of the pawl and holds its long arm in forward position away from the path of the teeth upon the front edge of the plate 58, Fig. 15. When the disk 56 is turned rearward at the beginning of the downward movement of the operating-bar A, the pawl is released and its spring 66 permitted to swing it rearward into engagement with the teeth upon the plate 58. These teeth slip freely downward over the pawl; but if the bar A be released before making a complete downstroke the engagement of the pawl with the teeth will prevent return upward movement of the bar. After the bar has been given a complete downward movement, Fig. 16, the turning of the disk 56 back to normal position at the beginning of the upward movement of the bar will retract the pawl from the path of the teeth upon the plate 58 and permit the return of the parts to normal position. A stop-pin or stud 69 limits the rearward movement of the pawl 65 in the position of the parts shown in Fig. 16.

For the purpose of permitting the operating-bar A to be depressed without turning the disk 56, and consequently without swinging the bail-rod 51 rearward and engaging the totalizing-wheels with the item-wheels, I provide the lever B, pivoted to the inner face of the side plate of the casing near its lower end at 71 and extending vertically through the top of the casing and provided upon its upper end with a suitable finger-piece, Fig. 1. A spring 72, coiled around the pivot 71 and engaging a pin upon the lever, presses the upper end of the latter forward and serves to yieldingly hold it in and return it to normal position. A pin 73 projects outward (to the left) from the pawl 59 into the path of the lever B, Figs. 13 and 15, so that when the upper end of the lever is swung rearward the pawl 59 will be retracted from the disk 56, with the result that if the operating-bar A be then depressed the pawl will not engage the disk in its downward movement, and the latter will remain unmoved. This provision for depressing the operating-bar at will without engaging the totalizing-wheels with the item-wheels permits the item-wheels and depressed keys to be restored to normal position by the depression of said bar to correct any mistakes that may have been made in setting the keys without adding anything upon the totalizing-wheels, since it will be remembered that the depression of the operating-bar restores the item-wheels and operated keys to initial position, and if this be done without engaging the totalizing-wheels with the item-wheels no addition upon the totalizing-wheels will be made.

The provision referred to serves a further purpose in "clearing" the machine or setting all of the totalizing-wheels to zero, which is accomplished in the following manner and by the means to be now described: Each totalizing-wheel 3 has projecting from its rear side a short lug 74, with which coöperates a similar lug 75, projecting forward from the corresponding item-wheel 2, Figs. 2, 3, 11, and 12. These lugs are so located relatively to each other upon each pair of wheels that if (in the absence of the pins 48) the totalizing-wheels be slid rearward into proximity to the item-wheels and the latter be then turned nine-tenths of a revolution from initial position in the direction of the arrows, Figs. 2 and 3, their lugs 75 will engage the lugs 74 upon the totalizing-wheels and carry the latter around with them to the position shown in Figs. 2 and 3, where the totalizing-wheels are at zero. Thus if in Figs. 2 and 3 the item-wheels 2 be given nine-tenths of a revolution in the direction of the arrows their lugs 75 will be carried around into position against the right sides of the lugs 74 upon the item-wheels 3, thus exposing the figure "9" upon each of the item-wheels, while leaving the totalizing-wheels unmoved. So if the totalizing-wheels instead of being at zero prior to such movement of the item-wheels exhibited various numbers it will be understood that such nine-tenths of a revolution of the item-wheels would cause their lugs 75 by engagement with the lugs 74 of the totalizing-wheels to pick up the latter wherever they might be standing and carry them to zero. By then returning the item-wheels to zero, while leaving the totalizing-wheels at zero, both sets of wheels will be brought to zero and the machine thus cleared. Now to this end I provide means for retracting the pins 48 rearward, sliding the totalizing-wheels rearward into proximity to the item-wheels, so that the lugs 75 upon the latter may contact with the lugs 74 upon the former when the item-wheels are turned, and then releasing all of the item-wheel shafts and permitting them to make nine-tenths of a revolution, thus bringing all of the item-wheels to "9" and all of the totalizing-wheels to zero, as before explained. For this purpose the pins 48 instead of being secured in the item-wheels 2 are carried by disks 76, fitting against the rear sides of said wheels, the pins 48 passing loosely through holes provided for them in the wheels 2. The disks 76 are carried by rearwardly-extending hubs or sleeves 77, which are provided at their rear ends with grooved collars 78, Fig. 3, engaged by a bail-rod 79, carried at its opposite ends by vertical arms 80, fast at their lower ends upon a rock-shaft 81, Figs. 8, 11, 12, and 12ª. At its right-hand end, Figs. 8 and 11, the rock-shaft has secured upon it the lower end of the lever D, whose upper end is shown in Fig. 1, and which has been heretofore referred to. Near its lower end the lever D is connected by a link 82 with the right-hand side arm of the bail-rod 51, heretofore described, Fig. 11, so that upon pressing the upper end of the lever D rearward the bail 79, engaging the grooved collars 78 of the sleeves 77, will carry the disks 76 rearward and retract the pins 48 within the wheels 2, while the link 82 will swing rearward the bail-rod 51 and carry the totalizing-wheels 3 rearward into proximity to the item-wheels 2. A further result of this rearward movement of the lever D is the release of all of the item-wheel-carrying shafts 1, so that their springs will be permitted to turn them forward nine-tenths of a revolution. This is accomplished by the following means: As shown in Figs. 3, 8, and 12, the rock-shaft 81 has secured to and projecting rearwardly from it, near its left-hand end, an arm 83, whose rear end overlies the outer end of the horizontal arm of a bell-crank lever 84, the upper end of whose vertical arm is forked and engages a pin 85, projecting from the forward side of a transverse plate or bar 86. This bar is mounted at its opposite ends by inclined slots 87 upon screw-studs 88, entering the cross-plate 5, and is pressed to the right by a spring 89, Fig. 8. When the bar 86 is slid toward the left, the inclination of the slots 87 will force it downward, and the bar is thus slid to the left and forced downward through the medium of the bell-crank 84, arm 83, and rock-shaft 81 whenever the lever D is pressed rearward. Now the bar 86 overlies the forwardly-projecting pins 23 of all of the bails 18, heretofore described, so that when said bar is slid to the left and forced downward it will engage the pins of said bails and press all of the bails downward, disengaging the latches 26 from the arms 24 and permitting the springs 25 to pull said arms 24 and the bails on downward to their limit of movement, as heretofore explained. This downward movement of the bails will cause the pins 22, projecting from their rear ends, Fig. 9, to trip all of the latches 15 and release all of the spring-pressed shafts 1, whereupon said shafts will turn nine-tenths of a revolution in the direction of the arrows and bring all of the item-wheels 2, carried by their front ends, to "9." During this movement of the item-wheels their lugs 75 will contact with the lugs 74 of the totalizing-wheels and carry all of the latter wheels around to zero, as before explained, (said wheels being arrested at such position by the means hereinafter described,) and upon then releasing the lever D the bail-rod 79 and all the parts which have been moved rearward by the lever D will be thrown forward to normal position again by the action of a spring 90, coiled around the left-hand end of the rock-shaft 81, Fig. 8, and connected at one end to said shaft and at its opposite end to a fixed point. This will leave all the parts in normal position, with the item-wheels standing at "9" and the totalizing-wheels standing at zero. The item-wheels may be then returned to zero by pressing rearward the lever B, heretofore described, and holding it in that position while depressing the operating-bar A, whereupon both sets of wheels will be brought to zero and the machine cleared.

While the details of this operation of clearing the machine and of the means for carrying it out have required considerable description, it will be understood that the actual operation is exceedingly simple, consisting in simply pressing rearward the lever D, then pressing rearward the lever B, and then depressing the operating-bar A while holding the lever B in rearward position, as stated in the early part of the specification.

When it is desired to repeat or add the same amount or item several times in succession, all that is necessary to be done is to throw out of operation the bail and key resetting rod 45, Figs. 9, 11, 12, and 13, so that when the operating-bar A is depressed the bails and keys will remain in set position. This is accomplished by pulling forward the lever C at the left side of the machine, Figs. 1, 2, 10, and 13. The lower end of this lever is connected by a link 91 with the upper end of the guide-arm 47, Fig. 13, so that when the upper end of the lever C is pulled forward the arm 47 will be swung rearward, carrying the rod 45 with it, whereupon said rod in its upward movements will clear the pins 22, projecting from the rear ends of the bails 18, as before explained, and fail to reset said bails and release the depressed keys. The rod 40, carried by the lower rear ends of the levers 37, will, however, reset the racks 43, Fig. 9, at each depression of the operating-bar A, and consequently return all the shafts and item-wheels to initial or zero position. Upon releasing said bar and permitting it to rise and the rod 40 to descend the racks 43 will be free to drop again, and the shafts and item-wheels will therefore be turned forward again by the coiled springs surrounding the shafts until arrested in the same position as before, and upon again depressing the operating-bar A they will be returned to zero position again and the same amount be again added upon the totalizing-wheels.

In the present instance, owing to the nature of the means provided for connecting the item-wheels with the totalizing-wheels—i. e., the pins and holes—I provide means (shown in Fig. 9) for preventing the racks 43 from dropping downward with the rod 40 immediately upon the release of the operating-bar A, such means consisting of bell-crank latches 92, pivoted at their elbows to the cross-plate 11 and provided at the outer ends of their horizontal arms with rearwardly-projecting pins 93, underlying the rod 40. Springs 94, coiled around the pivots of these latches, tend to swing their horizontal arms upward and their vertical arms to the right in Fig. 9. The rod 40 normally rests upon the pins 93 and holds the latches 92 in the position shown in Fig. 9; but when the operating-bar is depressed and the rod 40 lifted the latches are released and the springs 94 swing their horizontal arms upward. This will cause the vertical arms of the latches to bear against the pins 42 of the racks 43, which are being lifted by the rod 40, and as soon as said pins pass above the upper ends of the latch-arms the latter will catch under the pins and support the racks in elevated position. The pins 93 project forwardly as well as rearwardly of the horizontal arms of the latches, and their front ends extend through holes 95 in the frame-plate 11, the upper walls of which holes serve to arrest the movement of the latches under the action of their springs 94 in position for the upper ends of their vertical arms to support the pins 42 on the racks 43, as explained. Upon now releasing the operating-bar A and permitting it to rise and the rod 40 to descend the racks 43 will remain supported in normal position by the latches 92 until the rod 40 approaches its lower limit of movement, whereupon it will contact with the pins 93 of the latches and disengage the latter from the pins 42 on the racks, thereby permitting the racks which had been lifted by the upward movement of the rod 40 to drop back to the positions from which they were lifted and the shafts and item-wheels to be turned forward again to corresponding positions. As before stated, this provision for temporarily supporting the racks 43 and holding the shafts and item-wheels in zero position is necessitated by the particular means employed for connecting the item-wheels with the totalizing-wheels. As explained, the totalizing-wheels are slid rearward and their holes engaged with the pins of the item-wheels to connect the two sets of wheels together at the downward movement of the operating-bar and are slid forward to disconnect them at the upward movement of said bar, and it is to prevent the racks 43 from dropping with the rod 40 and the item-wheels from consequently turning forward again at the very beginning of the upward movement of the operating-bar (before the totalizing-wheels have been disengaged from the item-wheels) that the latches 92 and their operation, which have been described, are provided. If, for instance, item-wheels were connected with the totalizing-wheels by ordinary ratchet-and-pawl connections, so that the item-wheels would freely turn forward independently of the totalizing-wheels and carry the latter with them on their return movement, the latches 92 would be unnecessary.

All of my machine has now been described with the exception of the "carrying" or "transfer" mechanism by means of which each revolution of any one of the totalizing-wheels carries or transfers one unit to the next higher wheel in the series by advancing the latter wheel one number. This mechanism may be explained by reference to Figs. 3, 4, 5, 7, 11, and 12. As best shown in Figs. 3, 11, and 12, each of the grooved collars 50 upon the forward sides of the totalizing-wheels 3 carries at its front end a circular disk 96, a front elevation of which disks is shown in Fig. 7. Each of these disks is provided with ten equidistant holes 97 and with a single cam or projection 98 upon its periphery. Loosely mounted upon the front end of each shaft 1 in front of the forward cross-plate 4 of the casing, Figs. 4, 5, 11, and 12, is a three-armed lever E, whose vertical arm 99 carries a rearwardly-projecting pin 100, which extends rearwardly through an elongated hole 101 in the plate 4, Figs. 4, 11, and 12, and engages one of the holes 97 in the disk 96 in rear of the plate 4, Fig. 7. Coiled springs 102, surrounding the hubs of the levers E, Figs. 3, 11, and 12, tend to swing the upper arms 99 of said levers to the right, Fig. 4, and when permitted to act do swing said levers in that direction until the pins 100 contact with the end walls of the elongated holes 101 in the plate 4, such movement of the levers being just sufficient to turn the disks 96, engaged by the pins 100, one-tenth of a revolution, and consequently to advance the totalizing-wheels to which such disks are secured one number. The levers E are normally held from being turned by their springs by means of hooked latches 103, Figs. 4 and 5, the hooks of which latches normally engage the forwardly-bent lower ends of the depending arms 104 of the levers E, as most clearly shown in the rear view of one of said levers and latches at the right-hand end of Fig. 5. When the hooked end of any latch 103 is depressed, the corresponding lever E will be released and its spring 102 will (but not immediately) swing its upper arm 99 to the right in Fig. 4 (to the left in Fig. 5) and cause its pin 100 to advance the connected totalizing-wheel one number. Each latch 103 has projecting from its rear side a pin 105, which extends rearwardly through an opening 106 in the frame-plate 4, as most clearly shown in the case of the right-hand latch in Fig. 4, the pins themselves being all shown in section in the rear view of the latches, Fig. 5. The rear ends of these pins 105 project into the path of the cams 98 on the disks 96, secured to the totalizing-wheels 3, Fig. 7, with the result that whenever one of said wheels and disks completes a revolution its cam 98 will ride over the rear end of the corresponding pin 105 and depress the latch 103 from which said pin projects, thereby disengaging the hook of said latch from the arm 104 of the lever E, whose pin 100 coöperates with the disk 96 of the next higher wheel in the series, thereby releasing such lever E and permitting its spring to presently turn it and advance such higher wheel one number in the manner heretofore explained.

The third arm 107 of the levers E, projecting to the left between the upper and lower arms of said levers, Fig. 4, are the resetting-arms for the levers, to which end they are provided with forwardly-projecting pins 108, which underlie a transverse rod 109, Figs. 3 and 4, which is supported at its opposite ends by vertical arms 110, which are pivoted at their lower ends to the side arms 111 of a bail composed of said side arms and a cross-rod 112, which latter underlies the pins 108, projecting from the levers E, Figs. 11 and 12. The left-hand side arm 111 of this bail is extended vertically above its pivot, as shown in Figs. 12, 13, and 14, to form a bell-crank lever and carries at its upper end a stud 113, adapted to be engaged by the forward edge of a cam-plate 114, carried by the operating-bar A, said plate 114 being secured by screw-studs 115 to the plate 58, carried by the operating-bar A, and heretofore described, Figs. 3, 4, 6, 7, 13, 14, 15, and 16. A spring 116, connected to a pin 117, projecting from the left-hand side arm 111 of said bail, pulls the bail upward and yieldingly holds the parts in the position shown in Figs. 4, 11, 12, and 13, with the stud 113 immediately beneath and in the path of travel of the cam-plate 114, Fig. 13. When the operating-bar A is depressed, the cam-plate 114 will engage the stud 113 and rock the bell-crank arm 111 to the position shown in Fig. 14, thereby depressing the rod 112 and carrying the rod 109 downward with it. In its downward movement the rod 109 will contact with the pins 108 of all of the levers E, which have been turned from normal position to effect transfers, and will restore said levers to the position shown in Fig. 4 and reëngage their depending arms 104 with the hooks of the latches 103, thereby resetting all of the levers which have been operated. At its right-hand end, Figs. 2 and 3, the rod 109 is provided with a pin 109ª, which fits in a vertical guideway 109ᵇ on the side plate of the casing to guide the rod in its vertical movements.

Inasmuch as the latches 103 are depressed by the cam projections 98 upon the disks 96, Fig. 7, during the revolution of said disks with the totalizing-wheels, and inasmuch as during such revolution of the totalizing-wheels the latter are in rearward position in engagement with the item-wheels and their disks 96 consequently withdrawn from engagement with the pins 100, projecting rearward from the levers E, and inasmuch as such revolution of the totalizing-wheels is accomplished at the downstroke of the operating-bar A, and inasmuch as the cam-plate 114, Figs. 13 and 14, operates to rock the bell-crank 111 and depress the rod 109, Figs. 11 and 12, at the very beginning of the downward movement of the operating-bar, it follows that the levers E, whose latches may be tripped by revolutions of the totalizing-wheels, are not permitted to act immediately upon such tripping of their latches, but are held down in normal position, Fig. 4, by the rod 109, which rod at such time—i. e., during the downward movement of the operating-bar—will immediately overlie the pins 108, projecting from the arms 107 of said levers. The levers therefore cannot act to effect the transfers until the rod 109 rises, and the shape of the cam-plate 114 is such that the bell-crank 111, Fig. 13, is not permitted to swing backward toward normal position, and thereby lift the rod 109, until the operating-bar A approaches its limit of upward movement. During such upward movement, therefore, and before the rod 109 is lifted the totalizing-wheels and their disks 96 will have been returned to their normal forward position and the disks reëngaged with the pins 100 of the levers E, as shown in Fig. 3, so that when the rod 109 thereafter rises the turning of the levers E, whose latches have been tripped, will cause their pins 100 to advance the corresponding totalizing-wheels one number. For the purpose of holding the latches 103 depressed after they have been swung downward by the cam projections upon the disks 96 and preventing reëngagement of the hooks of said latches with the arms 104 of the levers E after the cam projections of the disks 96 have passed and cleared the pins 105 of the latches I provide each latch 103 near its left-hand end, Fig. 4, with a spring-pressed arm or supplemental latch 118, pivoted at its lower end to a depending extension of the latch 103 and normally bearing at its upper end against the right side of the forwardly-bent lower end of the depending arm 104 of the lever E. When the latch 103 is depressed and its hook disengaged from said arm 104 of the lever, the upper end of the supplemental latch 118 will be swung to the left by its spring into contact with a pin 119, provided for the purpose upon the main latch-arm 103. This will bring the upper end of the arm 118 immediately beneath the forwardly-bent lower end of the lever-arm 104, and the engagement of the two will prevent the hooked end of the latch 103 from rising and reëngaging the lever-arm 104 after the cam projection of the disk 96 passes the pin 105 of the latch 103. As before explained, the levers E are all held in normal position at such time by the depression of the rod 109; but as soon as said rod is lifted and the lever E permitted to be turned by its spring the lower end of its depending arm 104 will slip to the left off of the upper end of the supplemental latch 118, and the hooked end of the main latch 103 will thereupon be lifted to normal position by its spring 120. Upon the next depression of the operating-bar A and rod 109 and consequent return of the lever E to normal position the lower end of the arm 104 of the lever will ride over the beveled nose of the latch 103 and depress the same until it clears the hook of the latch, (pressing the upper end of the latch-arm 118 to the right in such movement,) whereupon the main latch 103 will be thrown upward by its spring and its hook reëngaged with the arm of the lever, as in Fig. 4, ready for another operation.

In Fig. 7 the disks 96 are shown in the position they occupy when the totalizing-wheels are all standing at zero, as in Figs. 1, 2, and 3, the cam projections 98 upon the disks standing immediately at the left of the pins 105, carried by the latches 103 of the transfer mechanism. These pins 105, in addition to their function as part of the transfer mechanism, which has been described, also serve as stops to arrest the movement of the totalizing-wheels when they are turned backward to zero in the operation of clearing the machine. Thus when the lever D is pressed rearward, and the item-wheels thereby caused to make nine-tenths of a revolution and their lugs 75 to engage the lugs 74 upon the totalizing-wheels and carry the latter backward to zero the abrupt faces of the cam projections 98 upon the disks 96 come into contact with the pins 105 when the wheels reach zero position and prevent further movement of them, as in Fig. 7, after which the item-wheels are turned back to zero position in the manner heretofore explained to complete the clearing of the machine.

The engagement of the pins 100 of the levers E with the holes in the disks 96, carried by the totalizing-wheels 3, serves to normally hold said wheels from rotation, Fig. 3. When the wheels are slid rearward far enough to disengage the disks from the pins, the holes in the wheels themselves become engaged with the pins 48 of the item-wheels 2, thereby locking the two sets of wheels together. The totalizing-wheels are therefore at all times engaged either with the pins 100 of the carrying-levers E or with the pins 48 of the item-wheels. While the totalizing-wheels are being turned by the item-wheels they are disengaged from the pins of the carrying-levers, and while they are being turned by the pins of the carrying-levers in effecting transfers they are disengaged from the pins of the item-wheels. At the depression of the operating-bar A the totalizing-wheels and their disks 96 are slid rearward before the rod 109 is depressed, so that when said rod is depressed the pins 100 of the carrying-levers are disengaged from the disks 96 and the levers are free to be rocked back to initial position by the depression of the rod 109 and reëngaged with the latches 103.

Having thus fully described my invention, I claim—

1. In an adding-machine, the combination of a plurality of rows of keys extending from front to rear of the machine, a corresponding plurality of numbered wheels, means controlled by the keys in each row for turning the corresponding wheel to an extent determined by the operated key, and a depressible cross-bar in front of the keys operable to restore the operated keys and wheel-operating means to initial position; substantially as described.

2. In an adding-machine, the combination of a plurality of rows of keys extending from front to rear of the machine, a corresponding plurality of item-wheels, means controlled by the keys in each row for turning the corresponding item-wheel to an extent determined by the operated key, a depressible cross-bar in front of the keys operable to restore the item-wheels to initial position, and a plurality of totalizing-wheels corresponding to the respective item-wheels and turning therewith in one direction but not in the other; substantially as described.

3. In an adding-machine, the combination of a plurality of rows of keys extending from front to rear of the machine, a corresponding plurality of numbered wheels located at the front of the machine, means controlled by the keys in each row for turning the corresponding wheel a distance determined by the operated key, and a depressible bar extending transversely of the machine between the row of numbered wheels and the keyboard and operable to restore the keys and operating means to initial position; substantially as described.

4. In an adding-machine, the combination of a plurality of rows of numbered keys extending from front to rear of the machine, a corresponding plurality of item-wheels located at the front of the machine, means controlled by the keys in each row for turning the corresponding item-wheel a distance determined by the operated key, a depressible bar extending transversely of the machine between the row of item-wheels and the keyboard and operable to return the item-wheels to initial position, and a plurality of totalizing-wheels located adjacent the item-wheels at the front of the machine and turning therewith in one direction but not in the other; substantially as described.

5. In an adding-machine, the combination of a plurality of rows of keys extending from front to rear of the machine, a corresponding plurality of item-wheels located at the front of the machine upon axes parallel with the rows of keys, means controlled by the keys in each row for turning the corresponding item-wheel a distance determined by the operated key, a depressible bar extending transversely of the machine between the item-wheels and the keyboard and operable to return the item-wheels to initial position, and a plurality of totalizing-wheels located adjacent the item-wheels upon the same axes and turning with the item-wheels in one direction but not in the other; substantially as described.

6. In an adding-machine, the combination of a plurality of rows of keys extending from front to rear of the machine, a corresponding plurality of item-wheels, means controlled by the keys in each row for turning the corresponding item-wheel a distance determined by the operated key, a plurality of totalizing-wheels, and a depressible bar operable to connect the two sets of wheels and return the item-wheels to initial position; substantially as described.

7. In an adding-machine, the combination of a plurality of rows of keys extending from front to rear of the machine, a corresponding plurality of item-wheels located at the front of the machine, means controlled by the keys in each row for turning the corresponding item-wheel a distance determined by the operated key, a plurality of totalizing-wheels located adjacent the item-wheels at the front of the machine and engageable with and disengageable from the item-wheels, and a depressible bar extending transversely of the machine between the item-wheels and the keyboard and operable to engage the two sets of wheels and return the item-wheels to initial position; substantially as described.

8. In an adding-machine, the combination of a plurality of rows of keys extending from front to rear of the machine, a corresponding plurality of item-wheels, means controlled by the keys in each row for turning the corresponding item-wheel a distance determined by the operated key, a plurality of totalizing-wheels, a depressible bar operable to connect the two sets of wheels and return the item-wheels to initial position, and means for preventing at will the connection of the two sets of wheels and permitting the item-wheels to be returned to initial position by the operation of the bar without turning the totalizing-wheels with them; substantially as described.

9. In an adding-machine, the combination of a plurality of rows of keys extending from front to rear of the machine, a corresponding plurality of numbered wheels, means controlled by the keys in each row for turning the corresponding wheel a distance determined by the operated key, a depressible bar operable to return the operating means and the operated keys to initial position, and means for preventing at will the return of the keys to initial position while permitting the return of the operating means by the operation of said bar; substantially as described.

10. In an adding-machine, the combination of a plurality of rows of keys extending from front to rear of the machine, a corresponding plurality of item-wheels, means controlled by the keys in each row for turning the corresponding item-wheel a distance determined by the operated key, a plurality of totalizing-wheels engageable with and disengageable from the corresponding item-wheels, a depressible bar operable to engage the two sets of wheels and return the item-wheels and operated keys to initial position, and means for preventing at will the return of the keys to initial position while permitting engagement of the two sets of wheels and return of the item-wheels by the operation of said bar; substantially as described.

11. In an adding-machine, the combination of a plurality of rows of keys extending from front to rear of the machine, a corresponding plurality of numbered wheels, means controlled by the keys in each row for turning automatically the corresponding numbered wheel a distance determined by the operated key, and means independent of the keys operable at will to turn all of said wheels from initial position to their limit of movement; substantially as described.

12. In an adding-machine, the combination of a plurality of rows of keys extending from front to rear of the machine, a corresponding plurality of item-wheels, means controlled by the keys in each row for turning the corresponding item-wheel a distance determined by the operated key, a plurality of totalizing-wheels corresponding to the respective item-wheels, means for turning all of the item-wheels a maximum distance and causing them to pick up the totalizing-wheels and carry them to zero, and means for then returning the item-wheels to initial position while leaving the totalizing-wheels at zero; substantially as described.

13. In an adding-machine, the combination of a plurality of rows of keys extending from front to rear of the machine, a corresponding plurality of item-wheels, means controlled by the keys in each row for turning the corresponding item-wheel a distance determined by the operated key, a plurality of totalizing-wheels engageable with and disengageable from the corresponding item-wheels, means for engaging the two sets of wheels and returning the item-wheels to initial position, means for turning all the item-wheels a maximum distance and causing them to pick up the totalizing-wheels and carry them to zero, and means for then returning the item-wheels to initial position while leaving the totalizing-wheels at zero; substantially as described.

14. In an adding-machine, the combination of a plurality of rows of keys, a corresponding plurality of item-wheels, means controlled by the keys in each row for turning the corresponding item-wheel a distance determined by the operated key, a plurality of totalizing-wheels corresponding with the item-wheels, means operable at will to turn all the item-wheels a maximum distance and cause them to pick up the totalizing-wheels and carry them to zero, and a depressible cross-bar operable to return the item-wheels to initial position while leaving the totalizing-wheels at zero; substantially as described.

15. In an adding-machine, the combination of a plurality of rows of keys, a corresponding plurality of item-wheels, means controlled by the keys in each row for turning the corresponding item-wheel a distance determined by the operated key, a plurality of totalizing-wheels engageable with and disengageable from the corresponding item-wheels, a depressible cross-bar operable to engage the two sets of wheels and return the item-wheels to initial position, means operable at will to turn all the item-wheels a maximum distance and cause them to pick up and carry the totalizing-wheels to zero, and means for permitting the subsequent return of the item-wheels to initial position by operation of said bar without engaging the totalizing-wheels with them; substantially as described.

16. In an adding-machine, the combination of a plurality of rows of numbered keys extending from front to rear of the machine, a corresponding plurality of item-wheels located at the front of the machine, means controlled by the keys in each row for turning the corresponding item-wheel a distance determined by the operated key, and operating to so turn said wheel immediately upon the operation of the key, a plurality of totalizing-wheels located adjacent the item-wheels at the front of the machine, and means operable to connect the two sets of wheels and return the item-wheels to initial position; substantially as described.

17. In an adding-machine, the combination of a plurality of rows of keys extending from front to rear of the machine, a corresponding plurality of item-wheels, means controlled by the keys in each row for turning the corresponding item-wheel a distance determined by the operated key, a plurality of totalizing-wheels, means operable to connect the two sets of wheels and return the item-wheels to initial position, and means for preventing at will the connection of the two sets of wheels and permitting the item-wheels to be returned to initial position without turning the totalizing-wheels with them; substantially as described.

18. In an adding-machine, the combination of a plurality of rows of keys, extending from front to rear of the machine, a plurality of numbered wheels located at the front of the machine, means controlled by the keys in each row for turning the corresponding wheel a distance determined by the operated key, means operable to return the operating means and keys to initial position, and supplemental means operable at will to permit return of the operating means to initial position without returning the keys; substantially as described.

19. In an adding-machine, the combination of a plurality of rows of keys, a corresponding plurality of item-wheels, means controlled by the keys in each row for turning the corresponding item-wheels a distance determined by the operated key, a plurality of totalizing-wheels, means operable to connect said wheels and return the item-wheels to initial position, and supplemental means operable at will to prevent return of the keys to initial position while permitting the connection of the two sets of wheels and return of the item-wheels to initial position; substantially as described.

20. In an adding-machine, the combination of a plurality of rows of keys, a plurality of shafts, means controlled by the keys in each row for turning the corresponding shaft a distance determined by the operated key, and a depressible cross-bar operable to return the shafts to initial position; substantially as described.

21. In an adding-machine, the combination of a plurality of rows of keys, a plurality of shafts, means controlled by the keys in each row for turning the corresponding shaft a distance determined by the operated key, a plurality of numbered wheels turning with said shafts in one direction but not in the other, and a depressible cross-bar operable to return the shafts to initial position; substantially as described.

22. In an adding-machine, the combination of a plurality of rows of keys, a corresponding plurality of shafts extending lengthwise of the rows of keys, means controlled by the keys in each row for turning the corresponding shaft a distance determined by the operated key, a plurality of totalizing-wheels, means for connecting said wheels with and disconnecting them from the respective shafts, and a depressible cross-bar operable to connect the wheels and shafts and return the latter to initial position; substantially as described.

23. In an adding-machine, the combination of a plurality of rows of keys, a plurality of shafts, means controlled by the keys in each row for turning the corresponding shaft a distance determined by the operated key, a plurality of numbered wheels fast upon the respective shafts, and a depressible cross-bar operable to return the shafts to initial position; substantially as described.

24. In an adding-machine, the combination of a plurality of rows of keys, a corresponding plurality of shafts, means controlled by the keys in each row for turning the corresponding shaft a distance determined by the operated key, a plurality of item-wheels turning with said shafts, a plurality of totalizing-wheels, means for connecting the totalizing-wheels with and disconnecting them from the item-wheels, and a depressible cross-bar operable to connect the totalizing-wheels with the item-wheels and return the latter to initial position; substantially as described.

25. In an adding-machine, the combination of a plurality of rows of keys, a corresponding plurality of shafts, means controlled by the keys in each row for turning the corresponding shaft a distance determined by the operated key, a plurality of item-wheels fast upon the respective shafts, a corresponding plurality of totalizing-wheels loose upon said shafts and engageable with and disengageable from the item-wheels, and a depressible cross-bar operable to engage the totalizing-wheels with the item-wheels and return the latter to initial position; substantially as described.

26. In an adding-machine, the combination of a plurality of rows of keys, a corresponding plurality of shafts, means controlled by the keys in each row for turning the corresponding shaft a distance determined by the operated key, a plurality of numbered wheels located upon the respective shafts near their front ends and turning with the shafts in one direction but not in the other, and a depressible bar extending transversely of the machine between said wheels and the keyboard and operable to return the shafts to initial position; substantially as described.

27. In an adding-machine, the combination of a plurality of rows of keys, a corresponding plurality of shafts, means controlled by the keys in each row for turning the corresponding shaft a distance determined by the operated key, a plurality of numbered wheels loosely mounted upon the respective shafts near their front ends, means for connecting said wheels with the shafts and disconnecting them therefrom, and a depressible bar extending transversely of the machine between said wheels and the keyboard and operable to connect the wheels with the shafts and return the latter to initial position; substantially as described.

28. In an adding-machine, the combination of a plurality of rows of keys, a corresponding plurality of shafts, means controlled by the keys in each row for turning the corresponding shaft a distance determined by the operated key, a plurality of item-wheels fast upon the respective shafts near their front ends, a corresponding plurality of totalizing-wheels loose upon said shafts adjacent the item-wheels and engageable with and disengageable therefrom, and a depressible bar extending transversely of the machine between the rows of wheels and the keyboard and operable to engage the totalizing-wheels with the item-wheels and return the latter to initial position; substantially as described.

29. In an adding-machine, the combination of a plurality of rows of keys, a corresponding plurality of shafts, means controlled by the keys in each row for turning the corresponding shaft a distance determined by the operated key, a plurality of totalizing-wheels, means for connecting said wheels with the respective shafts to cause them to turn in one direction with the shafts, a depressible cross-bar operable to connect said wheels and shafts and return the shafts to initial position, and means operable at will to prevent connection of the wheels with the shafts while permitting the shafts to be returned to initial position by the operation of said bar; substantially as described.

30. In an adding-machine, the combination of a plurality of rows of keys, a corresponding plurality of shafts, means controlled by the keys in each row for turning the corresponding shaft a distance determined by the operated key, a plurality of item-wheels turning in both directions with the respective shafts, a plurality of totalizing-wheels, means for connecting the totalizing-wheels with and disconnecting them from the item-wheels and shafts, a depressible cross-bar operable to connect the totalizing-wheels with the item-wheels and shafts and return the latter to initial position, and means operable at will to prevent connection of the totalizing-wheels with the item-wheels and shafts while permitting the latter to be returned to initial position by the operation of said bar; substantially as described.

31. In an adding-machine, the combination of a plurality of rows of keys, a corresponding plurality of shafts, means controlled by the keys in each row for turning the corresponding shaft a distance determined by the operated key, a plurality of item-wheels fast upon the respective shafts, a corresponding plurality of totalizing-wheels loose upon said shafts adjacent the item-wheels and engageable therewith and disengageable therefrom, a depressible cross-bar operable to engage the totalizing-wheels with the item-wheels and return the latter to initial position, and means operable at will to prevent the engagement of the totalizing-wheels with the item-wheels while permitting the return of the latter to initial position by the operation of said bar; substantially as described.

32. In an adding-machine, the combination of a plurality of rows of keys, a corresponding plurality of shafts, means controlled by the keys in each row for turning the corresponding shaft a distance determined by the operated key, a depressible cross-bar operable to return the shafts and operated keys to initial position, and means operable at will to prevent return of the keys to initial position while permitting the return of the shafts by the operation of said bar; substantially as described.

33. In an adding-machine, the combination of a plurality of rows of keys, a corresponding plurality of shafts, means controlled by the keys in each row for turning the corresponding shaft a distance determined by the operated key, a plurality of totalizing-wheels, means for connecting said wheels with and disconnecting them from the respective shafts, to cause the shafts to turn the wheels with them in one direction but not in the other, a depressible cross-bar operable to connect the wheels with the shafts and return the latter and the operated keys to initial position, and means operable at will to prevent return of the keys to initial position at the operation of said bar while permitting connection of the wheels with the shafts and return of the latter to such position; substantially as described.

34. In an adding-machine, the combination of a plurality of rows of keys, a corresponding plurality of shafts, means controlled by the keys in each row for turning the corresponding shaft a distance determined by the operated key, a plurality of item-wheels fast upon the respective shafts, a plurality of totalizing-wheels loose upon said shafts and engageable with and disengageable from the item-wheels, a depressible cross-bar operable to engage the totalizing-wheels with the item-wheels and return the latter and the operated keys to initial position, and means operable at will to prevent return of the keys to initial position at the operation of said bar; substantially as described.

35. In an adding-machine, the combination of a plurality of rows of keys, a corresponding plurality of shafts, means controlled by the keys in each row for turning the corresponding shaft a distance determined by the operated key, a plurality of numbered wheels located at the front of the machine, means for connecting the said wheels with and disconnecting them from the respective shafts, a depressible bar extending transversely of the machine between said wheels and the keyboard and operable to connect said wheels and shafts and return the shafts to initial position, and means operable at will to prevent connection of the wheels with the shafts while permitting the shafts to be returned to initial position by the operation of said bar; substantially as described.

36. In an adding-machine, the combination of a plurality of rows of keys, a corresponding plurality of shafts, means controlled by the keys in each row for turning the corresponding shaft a distance determined by the operated key, a plurality of totalizing-wheels loosely mounted on said shafts at the front of the machine, means for connecting said wheels with and disconnecting them from their respective shafts, a depressible bar extending transversely of the machine between said wheels and the keyboard and operable to connect the wheels and shafts and return the shafts to initial position, and means operable at will to prevent connection of the wheels with the shafts while permitting the shafts to be returned to initial position by the operation of said bar; substantially as described.

37. In an adding-machine, the combination of a plurality of rows of keys, a corresponding plurality of shafts, means controlled by the keys in each row for turning the corresponding shaft a distance determined by the operated key, a plurality of item-wheels fast upon the respective shafts at the front of the machine, a corresponding plurality of totalizing-wheels loose upon said shafts adjacent the item-wheels and engageable therewith and disengageable therefrom, a depressible bar extending transversely of the machine between the wheels and the keyboard and operable to engage the totalizing-wheels with the item-wheels and to return the latter and their shafts to initial position, and means operable at will to prevent engagement of the totalizing-wheels with the item-wheels while permitting the return of the latter to initial position by the operation of said bar; substantially as described.

38. In an adding-machine, the combination of a plurality of rows of keys, a corresponding plurality of shafts extending lengthwise of the rows of keys, means controlled by the keys in each row for turning the corresponding shaft a distance determined by the operated key, a plurality of totalizing-wheels located at the front of the machine and turning with said shafts in one direction but not in the other, a depressible bar extending transversely of the machine between said wheels and the keyboard and operable to return the shafts and operated keys to initial position, and means operable at will to prevent return of the keys to initial position while permitting the return of the shafts by the operation of said bar; substantially as described.

39. In an adding-machine, the combination of a plurality of rows of keys, a corresponding plurality of shafts extending lengthwise of the rows of keys, means controlled by the keys in each row for turning the corresponding shaft a distance determined by the operated key, a plurality of totalizing-wheels located at the front of the machine, means for connecting said wheels with and disconnecting them from the respective shafts, a depressible bar extending transversely of the machine between said wheels and the keyboard and operable to connect the wheels and shafts and to return the shafts and operated keys to initial position, and means operable at will to prevent return of the keys to initial position while permitting connection of the wheels and shafts and the return of the latter by the operation of said bar; substantially as described.

40. In an adding-machine, the combination of a plurality of rows of keys, a corresponding plurality of shafts extending lengthwise of the rows of keys, means controlled by the keys in each row for turning the corresponding shaft a distance determined by the operated key, a plurality of totalizing-wheels normally turning with the shafts in one direction but not in the other, means independent of the keys for turning all the shafts a maximum distance and causing them to carry the totalizing-wheels to zero, and means for then returning the shafts to initial position while leaving said wheels at zero, substantially as described.

41. In an adding-machine, the combination of a plurality of rows of keys, a corresponding plurality of shafts, means controlled by the keys in each row for turning the corresponding shaft a distance determined by the operated key, a plurality of item-wheels turning with the shafts, a corresponding plurality of totalizing-wheels, means for connecting the two sets of wheels and returning the item-wheels to initial position, means operable at will to turn all the shafts and item-wheels a maximum distance and cause them to pick up the totalizing-wheels and carry them to zero, and means for then returning the item-wheels and shafts to initial position while leaving the totalizing-wheels at zero; substantially as described.

42. In an adding-machine, the combination of a plurality of rows of keys, a corresponding plurality of shafts, means controlled by the keys in each row for turning the corresponding shaft a distance determined by the operated key, a plurality of totalizing-wheels, means for connecting said wheels with and disconnecting them from the respective shafts, a depressible cross-bar operable to connect the wheels with the shafts and return the latter to initial position, means operable at will to turn all of the shafts a maximum distance and cause them to carry the totalizing-wheels to zero, and means for then permitting the shafts to be returned to initial position by the operation of said bar while leaving the totalizing-wheels at zero; substantially as described.

43. In an adding-machine, the combination of a plurality of rows of keys, a corresponding plurality of shafts, means controlled by the keys in each row for turning the corresponding shaft a distance determined by the operated key, a plurality of item-wheels turning with the respective shafts, a plurality of totalizing-wheels, means for connecting the totalizing-wheels with and disconnecting them from the item-wheels and shafts, a depressible cross-bar operable to connect the totalizing-wheels with the item-wheels and shafts and return the latter to initial position, means independent of the keys operable at will to turn all of the shafts and item-wheels a maximum distance and cause them to pick up the totalizing-wheels and carry them to zero, and means for then permitting the item-wheels and shafts to be returned to initial position while leaving the totalizing-wheels at zero; substantially as described.

44. In an adding-machine, the combination of a plurality of rows of keys, a corresponding plurality of shafts, means controlled by the keys in each row for turning the corresponding shaft a distance determined by the operated key, a plurality of item-wheels fast upon the respective shafts near the front ends of the latter, a plurality of totalizing-wheels loose upon said shafts adjacent the item-wheels and engageable with and disengageable from them, a depressible cross-bar operable to engage the two sets of wheels and return the item-wheels and shafts to initial position, means independent of the keys operable at will to turn all of the shafts and item-wheels a maximum distance and cause them to pick up and carry the totalizing-wheels to zero, and means for then permitting the return of the item-wheels and shafts to initial position by said bar while leaving the totalizing-wheels at zero; substantially as described.

45. In an adding-machine, the combination of a plurality of rows of keys, a plurality of shafts extending lengthwise of the rows of keys, means controlled by the keys in each row for turning the corresponding shaft a distance determined by the operated key, a plurality of numbered wheels mounted directly upon said shafts and turning with them in one direction but not in the other, and means for returning the shafts to initial position; substantially as described.

46. In an adding-machine, the combination of a plurality of rows of keys, a corresponding plurality of shafts extending lengthwise of the rows of keys, means controlled by the keys in each row for turning the corresponding shaft a distance determined by the operated key, a plurality of totalizing-wheels mounted directly upon said shafts, means for connecting said wheels with and disconnecting them from their respective shafts, and means operable to connect the wheels and shafts and return the latter to initial position; substantially as described.

47. In an adding-machine, the combination of a plurality of rows of keys, a plurality of shafts extending lengthwise of the rows of keys, means controlled by the keys in each row for turning the corresponding shaft a distance determined by the operated key, a plurality of item-wheels fast upon the respective shafts, a plurality of totalizing-wheels loose thereon, means for connecting the totalizing-wheels with and disconnecting them from the shafts, and means operable to connect said wheels and shafts and return the latter to initial position; substantially as described.

48. In an adding-machine, the combination of a plurality of rows of keys, a corresponding plurality of shafts, means controlled by the keys in each row for turning the corresponding shaft a distance determined by the operated key, a plurality of totalizing-wheels, means for connecting the wheels with and disconnecting them from the respective shafts, means operable to connect said wheels and shafts and return the shafts to initial position, and supplemental means operable at will to prevent connection of the wheels with the shafts while permitting the shafts to be returned to initial position; substantially as described.

49. In an adding-machine, the combination of a plurality of rows of keys, a corresponding plurality of shafts, means controlled by the keys in each row for turning the corresponding shaft a distance determined by the operated key, a plurality of item-wheels turning in both directions with the respective shafts, a plurality of totalizing-wheels, means for connecting the totalizing-wheels with and disconnecting them from the respective shafts, means operable to connect the totalizing-wheels with said shafts and return the latter to initial position, and supplemental means operable at will to prevent the connection of the totalizing-wheels with the shafts while permitting the latter to be returned to initial position; substantially as described.

50. In an adding-machine, the combination of a plurality of rows of keys, a corresponding plurality of shafts, means controlled by the keys in each row for turning the corresponding shaft a distance determined by the operated key, a plurality of item-wheels fast upon the respective shafts, a corresponding plurality of totalizing-wheels loose upon said shafts adjacent the item-wheels and engageable therewith and disengageable therefrom, means operable to engage the totalizing-wheels with the item-wheels and return the latter to initial position, and supplemental means operable at will to prevent the engagement of the totalizing-wheels with the item-wheels while permitting the return of the latter to initial position; substantially as described.

51. In an adding-machine, the combination of a plurality of rows of keys, a corresponding plurality of shafts, means controlled by the keys in each row for turning the corresponding shaft a distance determined by the operated key, means operable to return the shafts and operated keys to initial position, and supplemental means operable at will to prevent return of the keys to initial position while permitting the return of the shafts thereto; substantially as described.

52. In an adding-machine, the combination of a plurality of rows of keys, a corresponding plurality of shafts, means controlled by the keys in each row for turning the corresponding shaft a distance determined by the operated key, a plurality of totalizing-wheels, means for connecting said wheels with and disconnecting them from the respective shafts, means operable to connect the wheels with the shafts and return the latter and the operated keys to initial position, and supplemental means operable at will to prevent return of the keys to initial position while permitting connection of the wheels with the shafts and return of the latter to such position; substantially as described.

53. In an adding-machine, the combination of a plurality of rows of keys, a corresponding plurality of shafts, means controlled by the keys in each row for turning the corresponding shaft a distance determined by the operated key, a plurality of item-wheels fast upon the respective shafts, a plurality of totalizing-wheels loose upon said shafts and engageable with and disengageable from the item-wheels, means operable to engage the totalizing-wheels with the item-wheels and return the latter and the operated keys to initial position, and supplemental means operable at will to prevent return of the keys to initial position while permitting the engagement of the totalizing-wheels with the item-wheels and the return of the latter to such position; substantially as described.

54. In an adding-machine, the combination of a plurality of rows of keys, a corresponding plurality of spring-pressed shafts, means operated by the keys in each row for releasing the corresponding shaft and permitting its spring to turn it a distance determined by the operated key, and a depressible cross-bar operable to return the shafts to initial position; substantially as described.

55. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of numbered wheels turning with the respective shafts, and a depressible cross-bar operable to return the shafts and wheels to initial position; substantially as described.

56. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of totalizing-wheels turning with the respective shafts in one direction but not in the other, and a depressible cross-bar operable to return the shafts to initial position; substantially as described.

57. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of totalizing-wheels, means for connecting them with and disconnecting them from the respective shafts, and a depressible cross-bar operable to connect said wheels and shafts and to turn the latter to initial position; substantially as described.

58. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels turning with the respective shafts, a plurality of totalizing-wheels turning with the respective shafts in one direction but not in the other, and a depressible cross-bar operable to return the item-wheels and shafts to initial position; substantially as described.

59. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels turning with the respective shafts, a plurality of totalizing-wheels, means for connecting the totalizing-wheels with and disconnecting them from the item-wheels and shafts, and a depressible cross-bar operable to connect the totalizing-wheels and shafts and return the latter to initial position; substantially as described.

60. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels fast upon the respective shafts near the front ends, a plurality of totalizing-wheels loose upon said shafts adjacent the item-wheels and engageable therewith, and a depressible cross-bar operable to engage the two sets of wheels and return the item-wheels and shafts to initial position; substantially as described.

61. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of totalizing-wheels, means for connecting said wheels with and disconnecting them from said shafts, a depressible cross-bar operable to connect the wheels and shafts and return the latter to initial position, and means operable at will to prevent connection of the wheels and shafts when the bar is operated to return the shafts to initial position; substantially as described.

62. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels turning with the respective shafts, a plurality of totalizing-wheels, means for connecting the totalizing-wheels with and disconnecting them from the item-wheels and shafts, a depressible cross-bar operable to connect the totalizing-wheels with the item-wheels and shafts and return the latter to initial position, and means operable at will to prevent connection of the totalizing-wheels with the item-wheels and shafts when the bar is operated to return the latter to initial position; substantially as described.

63. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels fast upon the respective shafts near their front ends, a plurality of totalizing-wheels loose upon said shafts adjacent the item-wheels and engageable therewith, a depressible cross-bar operable to engage the two sets of wheels and return the item-wheels and shafts to initial position, and means operable at will to prevent engagement of the two sets of wheels when the bar is operated to return the item-wheels and shafts; substantially as described.

64. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of totalizing-wheels, means for connecting said wheels with and disconnecting them from the respective shafts, a depressible cross-bar operable to connect the wheels and shafts and return the latter to normal position, and means operable at will to prevent connection of the wheels and shafts when the bar is operated to return the shafts; substantially as described.

65. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels turning with the respective shafts, a plurality of totalizing-wheels, means for connecting the totalizing-wheels with and disconnecting them from the item-wheels and shafts, a depressible cross-bar operable to connect the totalizing-wheels and shafts and return the latter to initial position, and means operable at will to prevent connection of the totalizing-wheels with the item-wheels and shafts when the bar is operated to return the shafts to initial position; substantially as described.

66. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels fast upon the respective shafts, a plurality of totalizing-wheels loose upon said shafts and engageable with the item-wheels, a depressible cross-bar operable to engage said wheels and return the item-wheels to initial position, and means operable at will to prevent engagement of said wheels when the bar is operated to return the item-wheels, substantially as described.

67. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of totalizing-wheels, means for connecting said wheels with and disconnecting them from the respective shafts, a depressible cross-bar operable to connect said wheels and shafts and to return the shafts to initial position, and means operable at will to prevent return of the keys to initial position when the bar is operated to connect the wheels and return the latter to initial position; substantially as described.

68. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels turning with the respective shafts, a plurality of totalizing-wheels, means for connecting the totalizing-wheels with and disconnecting them from the item-wheels and shafts, a depressible cross-bar operable to connect said wheels and shafts and to return the latter and the operated keys to initial position, and means operable at will to prevent return of the keys to initial position when the bar is operated to connect the wheels and shafts and return the latter; substantially as described.

69. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels fast upon the respective shafts, a plurality of totalizing-wheels loose upon said shafts adjacent the item-wheels and engageable therewith, a depressible cross-bar operable to engage the two sets of wheels and return the item-wheels and the operated keys to initial position, and means operable at will to prevent return of the keys to initial position when the bar is operated to engage the two sets of wheels and return the item-wheels and shafts to initial position; substantially as described.

70. In an adding-machine, the combination of a plurality of rows of keys, a plurality of spring-pressed shafts, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, and a depressible cross-bar operable to restore the shafts to initial position and reëngage them with their respective latches; substantially as described.

71. In an adding-machine, the combination of a plurality of rows of keys, a plurality of spring-pressed shafts, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of numbered wheels turning with the respective shafts, and a depressible cross-bar operable to return said wheels and shafts to initial position; substantially as described.

72. In an adding-machine, the combination of a plurality of rows of keys, a plurality of spring-pressed shafts, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated key, a plurality of totalizing-wheels turning with the respective shafts in one direction but not in the other, and a depressible cross-bar operable to return the shafts to initial position; substantially as described.

73. In an adding-machine, the combination of a plurality of rows of keys, a plurality of spring-pressed shafts, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of totalizing-wheels, means for connecting them with and disconnecting them from the respective shafts, and a depressible cross-bar operable to connect said wheels and shafts and to return the latter to initial position; substantially as described.

74. In an adding-machine, the combination of a plurality of rows of keys, a plurality of spring-pressed shafts, extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of item-wheels turning with the respective shafts, a plurality of totalizing-wheels turning with the respective shafts in one direction but not in the other, and a depressible cross-bar operable to return the item-wheels and shafts to initial position; substantially as described.

75. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of item-wheels turning with the respective shafts, a plurality of totalizing-wheels, means for connecting the totalizing-wheels with and disconnecting them from the item-wheels and shafts, and a depressible cross-bar operable to connect the totalizing-wheels with the item-wheels and 76. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of item-wheels fast upon the respective shafts near their front ends, a plurality of totalizing-wheels loose upon said shafts adjacent the item-wheels and engageable therewith, and a depressible cross-bar operable to engage the two sets of wheels and return the item-wheels and shafts to initial position; substantially as described.

77. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of totalizing-wheels, means for connecting said wheels with and disconnecting them from said shafts, a depressible cross-bar operable to connect the wheels and shafts and return the latter to initial position, and means operable at will to prevent connection of the wheels and shafts when the bar is operated to return the shafts to initial position; substantially as described.

78. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of item-wheels turning with the respective shafts, a plurality of totalizing-wheels, means for connecting the totalizing-wheels with and disconnecting them from the item-wheels and shafts, a depressible cross-bar operable to connect the totalizing-wheels with the item-wheels and shafts and return the latter to initial position, and means operable at will to prevent connection of the totalizing-wheels with the item-wheels and shafts when the bar is operated to return the latter to initial position; substantially as described.

79. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of item-wheels fast upon the respective shafts, a plurality of totalizing-wheels loose upon said shafts adjacent the item-wheels and engageable therewith, a depressible cross-bar operable to engage the two sets of wheels and return the item-wheels and shafts to initial position, and means operable at will to prevent engagement of the two sets of wheels when the bar is operated to return the item-wheels and shafts; substantially as described.

80. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of totalizing-wheels, means for connecting said wheels with and disconnecting them from the respective shafts, a depressible cross-bar operable to connect said wheels and shafts and to return the shafts and operated keys to initial position, and means operable at will to prevent return of the keys to initial position when the bar is operated to connect the wheels with the shafts and return the latter to initial position; substantially as described.

81. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of item-wheels turning with the shafts, a plurality of totalizing-wheels, means for connecting the totalizing-wheels with and disconnecting them from the item-wheels and shafts, a depressible cross-bar operable to connect said wheels and shafts and to return the latter and the operated keys to initial position, and means operable at will to prevent return of the keys to initial position when the bar is operated to connect the wheels and shafts and return the latter; substantially as described.

82. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of item-wheels fast upon the respective shafts, a plurality of totalizing-wheels loose upon said shafts adjacent the item-wheels and engageable therewith, a depressible cross-bar operable to engage the two sets of wheels and return the item-wheels and the operated keys to initial position, and means operable at will to prevent return of the keys to initial position when the bar is operated to engage the two sets of wheels and return the item-wheels and shafts to initial position; substantially as described.

83. In an adding-machine, the combination of a plurality of rows of keys, a corresponding plurality of spring-pressed shafts extending lengthwise of the rows of keys, a plurality of latches for holding the respective shafts in normal position against the tension of their springs, means operated by the keys of each row for tripping the latch of the corresponding shaft, a spiral row of projections upon each shaft and coöperating stops upon the keys of the adjacent row for arresting the shafts at points determined by the operated keys, and a depressible cross-bar operable to restore the shafts to initial position; substantially as described.

84. In an adding-machine, the combination of a plurality of rows of keys, a corresponding plurality of spring-pressed shafts extending lengthwise of the rows of keys, a plurality of shafts for holding the respective shafts in normal position against the tension of their springs, means operated by the keys of each row for tripping the latch of the corresponding shaft, a spiral row of projections upon each shaft and coöperating stops upon the keys of the adjacent row for arresting the shafts at points determined by the operated keys, a plurality of totalizing-wheels, means for connecting them with and disconnecting them from their respective shafts, and a depressible cross-bar operable to connect said wheels and shafts and return the latter to initial position; substantially as described.

85. In an adding-machine, the combination of a plurality of rows of keys, a corresponding plurality of spring-pressed shafts extending lengthwise of the rows of keys, a plurality of latches for holding the respective shafts in normal position against the tension of their springs, means operated by the keys of each row for tripping the latch of the corresponding shaft, a spiral row of projections upon each shaft for arresting the shafts at points determined by the operated keys, a plurality of item-wheels turning with the respective shafts, a plurality of totalizing-wheels, means for connecting the totalizing-wheels with and disconnecting them from the item-wheels and shafts, and a depressible cross-bar operable to connect the totalizing-wheels and shafts and return the latter to initial position; substantially as described.

86. In an adding-machine, the combination of a plurality of rows of keys, a corresponding plurality of spring-pressed shafts extending lengthwise of the rows of keys, a plurality of latches for holding the respective shafts in normal position against the tension of their springs, means operated by the keys of each row for tripping the latch of the corresponding shaft, a spiral row of projections upon each shaft and coöperating stops upon the keys of the adjacent row for arresting the shafts at points determined by the operated keys, a plurality of item-wheels fast upon the respective shafts near their front ends, a plurality of totalizing-wheels loose upon said shafts adjacent the item-wheels and engageable therewith, and a depressible cross-bar operable to engage the two sets of wheels and return the item-wheels and shafts to initial position; substantially as described.

87. In an adding-machine, the combination of a plurality of rows of keys, a corresponding plurality of spring-pressed shafts extending lengthwise of the rows of keys, a plurality of latches for holding the respective shafts in normal position against the tension of their springs, means operated by the keys of each row for tripping the latch of the corresponding shaft, a spiral row of projections upon each shaft and coöperating stops upon the keys of the adjacent row for arresting the shafts at points determined by the operated keys, a plurality of totalizing-wheels, means for connecting said wheels with and disconnecting them from said shafts, a depressible cross-bar operable to connect the wheels and shafts and return the latter to initial position, and means operable at will to prevent connection of the wheels and shafts when the bar is operated to return the shafts to initial position; substantially as described.

88. In an adding-machine, the combination of a plurality of rows of keys, a corresponding plurality of spring-pressed shafts extending lengthwise of the rows of keys, a plurality of latches for holding the respective shafts in normal position against the tension of their springs, means operated by the keys of each row for tripping the latch of the corresponding shaft, a spiral row of projections upon each shaft and coöperating stops upon the keys of the adjacent row for arresting the shafts at points determined by the operated keys, a plurality of totalizing-wheels, means for connecting said wheels with and disconnecting them from the respective shafts, a depressible cross-bar operable to connect said wheels and shafts and to return the shafts and operated keys to initial position, and means operable at will to prevent return of the keys to initial position when the bar is operated to connect the wheels and return the latter to initial position; substantially as described.

89. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, and a depressible cross-bar operable to return the shafts to initial position; substantially as described.

90. In an adding-machine, the combination of a plurality of rows of keys, a corresponding plurality of spring-pressed shafts extending lengthwise of the rows of keys, means operated by the keys in each row for releasing the corresponding shaft and permitting its spring to turn it a distance determined by the operated key, a plurality of numbered wheels mounted directly upon said shafts and turning with them in one direction but not in the other, and means for returning the shafts to initial position; substantially as described.

91. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of totalizing-wheels mounted directly upon said shafts, means for connecting said wheels with and disconnecting them from their respective shafts, and means operable to connect the wheels and shafts and return the latter to initial position; substantially as described.

92. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels fast upon the respective shafts, a plurality of totalizing-wheels loose thereon, means for connecting the totalizing-wheels with and disconnecting them from the shafts, and means operable to connect said wheels and shafts and return the latter to initial position; substantially as described.

93. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of totalizing-wheels, means for connecting the wheels with and disconnecting them from the respective shafts, means operable to connect said wheels and shafts and return the shafts to initial position, and supplemental means operable at will to prevent connection of the wheels with the shafts while permitting the shafts to be returned to initial position; substantially as described.

94. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels turning in both directions with the respective shafts, a plurality of totalizing-wheels, means for connecting the totalizing-wheels with and disconnecting them from the respective shafts, means operable to connect the totalizing-wheels with said shafts and return the latter to initial position, and supplemental means operable at will to prevent the connection of the totalizing-wheels with the shafts while permitting the latter to be returned to initial position; substantially as described.

95. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels turning in both directions with the respective shafts, a plurality of totalizing-wheels, means for connecting the totalizing-wheels with and disconnecting them from the respective shafts, means operable to connect the totalizing-wheels with said shafts and return the latter to initial position, and supplemental means operable at will to prevent the connection of the totalizing-wheels with the shafts while permitting the latter to be returned to initial position; substantially as described.

96. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels fast upon the respective shafts, a corresponding plurality of totalizing-wheels loose upon said shafts adjacent the item-wheels and engageable therewith and disengageable therefrom, means operable to engage the totalizing-wheels with the item-wheels and return the latter to initial position, and supplemental means operable at will to prevent the engagement of the totalizing-wheels with the item-wheels while permitting the return of the latter to initial position; substantially as described.

97. In an adding-machine, the combination of a plurality of rows of keys, a corresponding plurality of spring-pressed shafts, means operated by the keys in each row for releasing the corresponding shaft and permitting its spring to turn it a distance determined by the operated key, means operable to return the shafts and operated keys to initial position, and supplemental means operable at will to prevent return of the keys to initial position while permitting the return of the shafts thereto; substantially as described.

98. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of totalizing-wheels, means for connecting said wheels with and disconnecting them from the respective shafts, means operable to connect the wheels with the shafts and return the latter and the operated keys to initial position, and supplemental means operable at will to prevent return of the keys to initial position while permitting the connection of the wheels with the shafts and return of the latter to such position; substantially as described.

99. In an adding-machine, the combination of a plurality of rows of keys, a corresponding plurality of spring-pressed shafts, means operated by the keys in each row for releasing the corresponding shaft and permitting its spring to turn it a distance determined by the operated key, a plurality of item-wheels fast upon the respective shafts, a plurality of totalizing-wheels loose upon said shafts and engageable with and disengageable from the item-wheels, means operable to engage the totalizing-wheels with the item-wheels and return the latter and the operated keys to initial position, and supplemental means operable at will to prevent return of the keys to initial position while permitting the engagement of the totalizing-wheels with the item-wheels and the return of the latter to such position; substantially as described.

100. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of numbered wheels mounted directly upon said shafts and turning with them in one direction but not in the other, and means for returning the shafts to initial position; substantially as described.

101. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of totalizing-wheels mounted directly upon said shafts, means for connecting said wheels with and disconnecting them from their respective shafts, and means operable to connect the wheels and shafts and return the latter to initial position; substantially as described.

102. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of item-wheels fast upon the respective shafts, a plurality of totalizing-wheels loose thereon, means for connecting the totalizing-wheels with and disconnecting them from the shafts, and means operable to connect said wheels and shafts and return the latter to initial position; substantially as described.

103. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of totalizing-wheels, means for connecting said wheels with and disconnecting them from said shafts, means operable to connect the wheels and shafts and return the latter to initial position, and supplemental means operable at will to prevent connection of the wheels and shafts when the latter are returned to initial position; substantially as described.

104. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of item-wheels fast upon the respective shafts, a plurality of totalizing-wheels loose upon said shafts adjacent the item-wheels and engageable therewith, means operable to engage the two sets of wheels and return the item-wheels and shafts to initial position, and supplemental means operable at will to prevent engagement of the two sets of wheels when the item-wheels and shafts are returned to such position; substantially as described.

105. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of totalizing-wheels, means for connecting said wheels with and disconnecting them from the respective shafts, means operable to connect said wheels and shafts and to return the shafts and operated keys to initial position, and supplemental means operable at will to prevent return of the keys to initial position when the shafts are returned thereto; substantially as described.

106. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of item-wheels fast upon the respective shafts, a plurality of totalizing-wheels loose upon said shafts adjacent the item-wheels and engageable therewith, means operable to engage the two sets of wheels and return the item-wheels and the operated keys to initial position, and supplemental means operable at will to prevent return of the keys to initial position when the item-wheels are returned thereto; substantially as described.

107. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of numbered wheels turning with said shafts in one direction but not in the other, and a depressible cross-bar operable to return the shafts to initial position; substantially as described.

108. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of item-wheels fast upon the respective shafts, a corresponding plurality of totalizing-wheels loose upon said shafts and engageable with and disengageable from the item-wheels, and a depressible cross-bar operable to engage the totalizing-wheels with the item-wheels and return the latter to initial position; substantially as described.

109. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of numbered wheels located upon the respective shafts near their front ends and turning with the shafts in one direction but not in the other, and a depressible bar extending transversely of the machine between said wheels and the keyboard and operable to return the shafts to initial position; substantially as described.

110. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of numbered wheels loosely mounted upon the respective shafts near their front ends, means for connecting said wheels with the shafts and disconnecting them therefrom, and a depressible bar extending transversely of the machine between said wheels and the keyboard and operable to connect the wheels with the shafts and return the latter to initial position; substantially as described.

111. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of totalizing-wheels, means for connecting said wheels with the respective shafts, a depressible cross-bar operable to connect said wheels and shafts and return the shafts to initial position, and means operable at will to prevent connection of the wheels with the shafts while permitting the shafts to be returned to initial position by the operation of said bar; substantially as described.

112. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of item-wheels fast upon the respective shafts, a corresponding plurality of totalizing-wheels loose upon said shafts adjacent the item-wheels and engageable therewith and disengageable therefrom, a depressible cross-bar operable to engage the totalizing-wheels with the item-wheels and return the latter to initial position, and means operable at will to prevent engagement of the totalizing-wheels with the item-wheels while permitting the return of the latter to initial position by the operation of said bar; substantially as described.

113. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a depressible cross-bar operable to return the shafts and operated keys to initial position, and means operable at will to prevent return of the keys to initial position while permitting the return of the shafts by the operation of said bar; substantially as described.

114. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of totalizing-wheels, means for connecting said wheels with and disconnecting them from the respective shafts, a depressible cross-bar operable to connect the wheels with the shafts and return the latter and the operated keys to initial position, and means operable at will to prevent return of the keys to initial position at the operation of said bar while permitting connection of the wheels with the shafts and return of the latter to such position; substantially as described.

115. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of item-wheels fast upon the respective shafts, a plurality of totalizing-wheels loose upon said shafts and engageable with and disengageable from the item-wheels, a depressible cross-bar operable to engage the totalizing-wheels with the item-wheels and return the latter and the operated keys to initial position, and means operable at will to prevent return of the keys to initial position at the operation of said bar; substantially as described.

116. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of numbered wheels turning with said shafts in one direction but not in the other, and means operable to return the shafts to initial position; substantially as described.

117. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of item-wheels fast upon the respective shafts, a corresponding plurality of totalizing-wheels loose upon said shafts and engageable with and disengageable from the item-wheels, and means operable to return the shafts to initial position; substantially as described.

118. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of numbered wheels located upon the respective shafts near their front ends and turning with the shafts in one direction but not in the other, and means for returning the shafts to initial position; substantially as described.

119. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of numbered wheels loosely mounted upon the respective shafts near their front ends, means for connecting said wheels with the shafts and disconnecting them therefrom, and means operable to connect the wheels with the shafts and return the latter to initial position.

120. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of totalizing-wheels, means for connecting said wheels with the respective shafts, means operable to connect said wheels and shafts and return the shafts to initial position, and supplemental means operable at will to prevent connection of the wheels with the shafts while permitting the shafts to be returned to initial position; substantially as described.

121. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of item-wheels fast upon the respective shafts, a corresponding plurality of totalizing-wheels loose upon said shafts adjacent the item-wheels and engageable therewith and disengageable therefrom, means operable to engage the totalizing-wheels with the item-wheels and return the latter to initial position, and supplemental means operable at will to prevent engagement of the totalizing-wheels with the item-wheels while permitting the return of the latter to initial position; substantially as described.

122. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, means for returning the shafts and operated keys to initial position, and supplemental means operable at will to prevent return of the keys to initial position while permitting the return of the shafts thereto; substantially as described.

123. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of totalizing-wheels, means for connecting said wheels with and disconnecting them from the respective shafts, means operable to connect the wheels with the shafts and return the latter and the operated keys to initial position, and supplemental means operable at will to prevent return of the keys to initial position while permitting connection of the wheels with the shafts and return of the latter to such position; substantially as described.

124. In an adding-machine, the combination of a plurality of rows of keys provided with vertical slots, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, projections upon the respective shafts coöperating with the bottoms of the vertical slots in the keys to arrest the shafts at points determined by the operated keys, a plurality of item-wheels fast upon the respective shafts, a plurality of totalizing-wheels loose upon said shafts and engageable with and disengageable from the item-wheels, means operable to engage the totalizing-wheels with the item-wheels and return the latter and the operated keys to initial position, and means operable at will to prevent return of the keys to initial position when the shafts are returned thereto; substantially as described.

125. In an adding-machine, the combination of a plurality of rows of keys, a corresponding plurality of rows of spring-pressed shafts extending lengthwise of the rows of keys, means operated by the keys in each row for releasing the corresponding shaft and permitting its spring to turn it a distance determined by the operated key, a plurality of totalizing-wheels normally turning with the shaft in one direction but not in the other, means independent of the keys for turning all of the shafts a maximum distance and causing them to carry the totalizing-wheels to zero, and means for then returning the shafts to initial position while leaving said wheels at zero; substantially as described.

126. In an adding-machine, the combination of a plurality of rows of keys, a corresponding plurality of rows of spring-pressed shafts extending lengthwise of the rows of keys, means operated by the keys in each row for releasing the corresponding shaft and permitting its spring to turn it a distance determined by the operated key, a plurality of item-wheels turning with the shafts, a corresponding plurality of totalizing-wheels, means for connecting the two sets of wheels and returning the item-wheels to initial position, means independent of the keys for turning all of the shafts and item-wheels a maximum distance and causing them to pick up the totalizing-wheels and carry them to zero, and means for then returning the item-wheels and shafts to initial position while leaving the totalizing-wheels at zero; substantially as described.

127. In an adding-machine, the combination of a plurality of rows of keys, a corresponding plurality of rows of spring-pressed shafts extending lengthwise of the rows of keys, means operated by the keys in each row for releasing the corresponding shaft and permitting its spring to turn it a distance determined by the operated key, a plurality of totalizing-wheels, means for connecting said wheels with and disconnecting them from the respective shafts, a depressible cross-bar operable to connect the wheels with the shafts and return the latter to initial position, means independent of the keys for turning all of the shafts a maximum distance and causing them to carry the totalizing-wheels to zero, and means for then permitting the shafts to be returned to initial position by operation of said bar while leaving the totalizing-wheels at zero; substantially as described.

128. In an adding-machine, the combination of a plurality of rows of keys, a corresponding plurality of rows of spring-pressed shafts extending lengthwise of the rows of keys, means operated by the keys in each row for releasing the corresponding shaft and permitting its spring to turn it a distance determined by the operated key, a plurality of item-wheels fast upon the respective shafts, a plurality of totalizing-wheels loose upon said shafts adjacent the item-wheels and engageable with and disengageable from them, a depressible cross-bar operable to engage the two sets of wheels and return the item-wheels and shafts to initial position, means independent of the keys for turning all of the shafts and item-wheels a maximum distance and causing them to pick up and carry the totalizing-wheels to zero, and means for then permitting the return of the item-wheels and shafts to initial position by said bar while leaving the totalizing-wheels at zero; substantially as described.

129. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of totalizing-wheels normally turning with the shafts in one direction but not in the other, means independent of the keys for tripping all of the latches and permitting all of the shafts to turn a maximum distance and carry the totalizing-wheels to zero, and means for then returning the shafts to initial position while leaving said wheels at zero; substantially as described.

130. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of totalizing-wheels, means for connecting said wheels with and disconnecting them from the respective shafts, a depressible cross-bar operable to connect the wheels with the shafts and return the latter to initial position, means independent of the keys for tripping the latches of all of the shafts and permitting the shafts to turn a maximum distance and carry the totalizing-wheels to zero, and means for then permitting the shafts to be returned to initial position by operation of the cross-bar while leaving the totalizing-wheels at zero; substantially as described.

131. In an adding-machine, the combination of a plurality of rows of keys, a plurality of spring-pressed shafts extending lengthwise of the rows of keys, a plurality of latches operating to hold the shafts in normal position against the tension of their springs, means operated by the keys in each row for tripping the latch of the corresponding shaft and permitting the latter to be turned by its spring, coöperating stops upon the keys and projections upon the shafts for causing the shafts to be arrested at points determined by the operated keys, a plurality of item-wheels fast upon the respective shafts, a plurality of totalizing-wheels loose upon said shafts adjacent the item-wheels and engageable with and disengageable from them, means operable to engage the two sets of wheels and to return the item-wheels and shafts to initial position, means independent of the keys for tripping all of the latches and permitting all of the shafts and item-wheels to turn a maximum distance and carry the totalizing-wheels zero, and means for then permitting the return of the item-wheels and shafts to initial position while leaving the totalizing-wheels at zero; substantially as described.

132. In an adding-machine, the combination of a shaft, a tubular casing surrounding the shaft and turning therewith, a coiled spring surrounding the shaft within the casing and tending to turn the shaft, and means for holding the shaft from movement and for releasing and arresting it at will; substantially as described.

133. In an adding-machine, the combination of a shaft, a tubular casing surrounding the shaft and turning therewith, a coiled spring surrounding the shaft within the casing and tending to turn the shaft, means for holding the shaft from movement, and a plurality of stops for arresting the shaft at different points in its movement when released from the holding means; substantially as described.

134. In an adding-machine, the combination of a shaft, a tubular casing surrounding the shaft and turning therewith, a coiled spring surrounding the shaft within the casing and tending to turn the shaft, means for holding the shaft from movement, a plurality of keys, and coöperating stops upon the keys and projections upon the shaft for arresting the shaft at different points when released from its holding means; substantially as described.

135. In an adding-machine, the combination of a shaft, a tubular casing surrounding the shaft and turning therewith, a coiled spring surrounding the shaft within the casing and having one end secured thereto, means for turning the opposite end of the spring about the shaft to adjust the tension of the spring, and means for holding the shaft from movement and for releasing and arresting it at will; substantially as described.

136. In an adding-machine, the combination of a plurality of rows of keys, a plurality of shafts extending lengthwise of the rows of keys, tubular casings surrounding the respective shafts and turning therewith, coiled springs surrounding said shafts within said casings and tending to turn the shafts, and means controlled by the keys in each row for releasing the corresponding shaft and arresting it at a point determined by the operated key; substantially as described.

137. In an adding-machine, the combination of a plurality of rows of keys, a plurality of shafts extending lengthwise of the rows of keys, a plurality of tubular casings inclosing the respective shafts and turning therewith, a coiled spring surrounding each shaft within its casing and having one end secured thereto, means for turning the opposite end of the spring about the shaft to adjust the tension of the spring, and means controlled by the keys for holding the shafts from movement and for arresting them at points determined by the operated keys; substantially as described.

138. In an adding-machine, the combination of a plurality of rows of keys, a plurality of shafts extending lengthwise of the rows of keys, a plurality of tubular casings inclosing the respective shafts and turning therewith, a coiled spring surrounding each shaft within its casing and secured at one end thereto, a rotatable ratchet having the opposite end of the spring connected to it, a pawl coöperating with the ratchet to hold it in any position to which it may be turned to adjust the tension of the spring, and means controlled by the keys for holding the shafts from movement and for arresting them at points determined by the operated keys; substantially as described.

139. In an adding-machine, the combination of a plurality of rows of keys, a plurality of shafts extending lengthwise of the rows of keys, a plurality of tubular casings inclosing the respective shafts and turning therewith, a coiled spring surrounding each shaft in its tubular casing and tending to turn the shaft, and projections upon the casings coöperating with stops upon the keys for arresting the shafts at points determined by the operated keys; substantially as described.

140. In an adding-machine, the combination of a plurality of rows of keys, a plurality of shafts extending lengthwise of the rows of keys, a plurality of tubular casings inclosing the respective shafts and turning therewith, a coiled spring surrounding each shaft within its casing and tending to turn the shaft, means controlled by the keys in each row for holding the shaft from movement and releasing it at will, and projections upon the tubular casings coöperating with stops upon the keys to arrest the shafts at points determined by the operated keys; substantially as described.

141. In an adding-machine, the combination of a plurality of rows of keys, a plurality of shafts extending lengthwise of the rows of keys, means controlled by the keys in each row for turning the shaft a distance determined by the operated key, and means independent of the keys for turning all of the shafts a maximum distance at will; substantially as described.

142. In an adding-machine, the combination of a plurality of rows of keys, a plurality of spring-pressed shafts extending lengthwise of the rows of keys, a plurality of latches for holding the shafts in normal position, means operated by the keys in each row for tripping the latch of the corresponding shaft and permitting the shaft to turn a distance determined by the operated key, and means independent of the keys for tripping the latches of all of the shafts at will and permitting the shafts to turn a maximum distance; substantially as described.

143. In an adding-machine, the combination of a plurality of rows of keys, a plurality of spring-pressed shafts extending lengthwise of the rows of keys, a plurality of latches for holding the shafts in normal position, a plurality of depressible bails coöperating with the respective latches, through the medium of which the depression of the key in any row trips the latch of the corresponding shaft, and means independent of the keys for depressing all of the bails and thereby tripping all of the latches and permitting the shafts to turn a maximum distance; substantially as described.

144. In an adding-machine, the combination of a depressible key, means for normally holding the key in elevated position, and a spring tending to depress the key, which spring is permitted to act upon a slight depression of the key to carry it downward to its limit of movement; substantially as described.

145. In an adding-machine, the combination of a depressible key, a spring tending to lift said key and against the resistance of which it must be depressed, a stronger spring tending to depress the key, and means controlled by the initial movement of the key for holding the key in normal position; substantially as described.

146. In an adding-machine, the combination of a row of depressible keys, a swinging bail adjacent said row of keys, a spring tending to swing said bail downward, means for holding the bail in upper position against the tension of such spring, and means operated by the initial depression of any key for connecting such key with the bail and releasing the bail; substantially as described.

147. In an adding-machine, the combination of a row of depressible keys, a swinging bail adjacent such row of keys, a spring tending to depress such bail, means for holding the bail in normal position against the tension of such spring, means operated by the initial depression of any key in the row for releasing the bail and connecting such key with it, and resetting-springs for the keys operating to lift them when the bail is restored to normal position; substantially as described.

148. In an adding-machine, the combination of a row of depressible keys, a swinging bail adjacent such row of keys, a spring tending to depress said bail, a latch for holding it in normal position adapted to be tripped by the initial depression of any key in the row, and means for causing the depression of the bail by its spring to carry the key downward to its limit of movement; substantially as described.

149. In an adding-machine, the combination of a row of depressible keys, a swinging bail adjacent such row of keys and adapted to be depressed by the depression of any key in the row, a spring tending to depress said bail, a latch operating to normally hold the bail in an elevated position and arranged to be tripped at the initial depression of the bail by any key in the row, and means for causing the further depression of the bail by its spring to carry the operated key downward to its limit of movement; substantially as described.

150. In an adding machine, the combination of a row of depressible keys, a swinging bail adjacent such row of keys, a spring tending to depress said bail, means controlled by the keys in each row for holding it in normal position against the tension of such spring, means for causing the bail, when released by the initial depression of any key in the row, to carry such key downward to its limit of movement, and resetting-springs for the keys operating to lift them when the bail is restored to normal position; substantially as described.

151. In an adding-machine, the combination of a plurality of rows of keys, a plurality of depressible bails adjacent the respective rows of keys, springs tending to depress said bails, means controlled by the keys in each row for holding the corresponding bail in normal position, means for causing the bails released by the depression of any keys to carry said keys downward to their limit of movement, and means common to all of the bails for restoring them to normal position; substantially as described.

152. In an adding-machine, the combination of a plurality of rows of keys, a plurality of depressible bails adjacent the respective rows of keys, springs tending to depress said bails, means controlled by the keys in each row for holding the corresponding bail in normal position, means for causing the bails released by the depression of any keys to carry said keys downward to their limit of movement, and resetting-springs for the keys operating to lift them when the bails are restored to normal position; substantially as described.

153. In an adding-machine, the combination of a plurality of rows of keys, a plurality of swinging bails adjacent said rows of keys, springs tending to depress said bails, a latch for each bail controlled by the keys in the corresponding row and adapted to be tripped to release the bail at the depression of any key in said row, means for causing the bails released by the initial depression of any keys to carry said keys downward to their limit of movement, and means common to all the bails for restoring them to initial position and reëngaging them with their latches; substantially as described.

154. In an adding-machine, the combination of a plurality of rows of keys, a plurality of swinging bails adjacent said rows of keys, springs tending to depress said bails, a latch for each bail controlled by the keys in the corresponding row and adapted to be tripped to release the bail at the depression of any key in said row, means for causing the bails released by the initial depression of any keys to carry said keys downward to their limit of movement, and resetting-springs for the keys operating to lift the keys when the bails are restored to normal position; substantially as described.

155. In an adding-machine, the combination of a plurality of rows of depressible keys, a plurality of swinging bails adjacent said rows of keys, springs tending to depress said bails, means controlled by the keys for holding the bails in normal position, means for causing any bail released by the initial depression of a key in the corresponding row to carry such key downward to its limit of movement, and a depressible cross-bar operable to restore the bails to normal position; substantially as described.

156. In an adding-machine, the combination of a plurality of rows of depressible keys, a plurality of swinging bails adjacent said rows of keys, springs tending to depress said bails, means controlled by the keys for holding the bails in normal position, means for causing any bail released by the initial depression of a key in the corresponding row to carry such key downward to its limit of movement, and resetting-springs for the keys operating to lift them when the bails are restored to normal position by the operation of said bar; substantially as described.

157. In an adding-machine, the combination of a row of depressible keys each provided with a slot and pin, a swinging bail adjacent such row of keys provided opposite each key with a pin and recess coöperating with the slot and pin of such key, whereby the depression of the key will depress the bail and connect the bail to the key, a spring tending to depress the bail, and means controlled by the keys for holding the bail in normal position; substantially as described.

158. In an adding-machine, the combination of a row of depressible keys each provided with a slot and pin, a swinging bail adjacent such row of keys provided opposite each key with a pin and recess coöperating with the slot and pin of such key, whereby the depression of the key will depress the bail and connect the bail to the key, a pivoted arm adapted to act on said bail to depress the same, a spring connected to said arm, and a latch controlled by the keys for holding the arm in normal position and preventing action of the spring upon the bail; substantially as described.

159. In an adding-machine, the combination of a plurality of rows of keys, bails, springs tending to depress said bails, means controlled by the keys in each row for holding the corresponding bail in normal position, means for causing any bail released by the initial depression of the key to carry said key downward to its limit of movement, a depressible cross-bar operable to restore the bails to normal position, and means for throwing the restoring means operated by said bar out of action, to permit the depression of the bar without resetting the bails; substantially as described.

160. In an adding-machine, the combination of a plurality of rows of keys, a plurality of spring-pressed shafts extending lengthwise of said rows of keys, means controlled by the keys in each row for holding the corresponding shaft in normal position and for arresting it at points determined by the operated keys, a plurality of swinging racks meshing with pinions upon the respective shafts, and a reciprocating rod common to said racks for restoring them and the shafts to normal position; substantially as described.

161. In an adding-machine, the combination of a plurality of rows of keys, a plurality of spring-pressed shafts extending lengthwise of said rows of keys, means controlled by the keys in each row for holding the corresponding shaft in normal position and for arresting it at points determined by the operated key, a plurality of swinging racks meshing with pinions fast upon the rear ends of the shafts, a depressible cross-bar at the front of the machine, and a resetting-rod at the rear of the machine operated by the depression of said cross-bar to restore the racks and shafts to initial position; substantially as described.

162. In an adding-machine, the combination of a plurality of rows of keys, a plurality of spring-pressed shafts, means controlled by the keys in each row for holding the corresponding shaft in normal position and for arresting it at points determined by the operated keys, means for restoring the shafts to initial position, a depressible cross-bar for operating said means, latches for temporarily holding the shafts in initial position when returned thereto by the depression of said cross-bar, and means for tripping said latches at the return upward movement of the cross-bar to again release the shafts; substantially as described.

163. In an adding-machine, the combination of a plurality of rows of keys, a plurality of spring-pressed shafts, means controlled by the keys in each row for holding the corresponding shaft in normal position and arresting it at points determined by the operated key, a plurality of racks meshing with pinions upon the rear ends of the shafts, a vertically-reciprocating cross-rod operable at its upward movement to restore said racks and shafts to initial position, and latches arranged to temporarily hold said racks and shafts in normal position and to be tripped at the downward movement of said rod, to again release them; substantially as described.

164. In an adding-machine, the combination of a plurality of rows of keys, a plurality of spring-pressed shafts, means controlled by the keys in each row for holding the corresponding shaft in normal position and arresting it at points determined by the operated key, a plurality of racks meshing with pinions fast upon the rear ends of the shafts and each provided with a rearwardly-projecting pin, a vertically-movable cross-rod adapted at its upward movement to engage said pins and lift the released racks and restore them and their shafts to normal position, latches for temporarily holding said racks and shafts in normal position when returned thereto by the upward movement of said rod, and pins projecting from said latches and adapted to be engaged by said rod at its downward movement to trip the latches and again release the racks and shafts; substantially as described.

165. In an adding-machine, the combination of a plurality of rows of keys, a plurality of swinging bails adjacent such rows of keys and each adapted to be depressed by the operation of any key in the corresponding row, a vertically-movable cross-rod adapted to lift said bails to normal position, and means for throwing said cross-rod out of operative position, to permit vertical movement of it without resetting the bails; substantially as described.

166. In an adding-machine, the combination of a plurality of rows of keys, a plurality of swinging bails adjacent the respective rows of keys, each provided with a rearwardly-projecting pin and adapted to be depressed by the operation of any key in the corresponding row, a vertically-reciprocating cross-rod at the rear of the machine adapted to engage the pins of the depressed bails and lift them to normal position, and a depressible cross-bar at the front of the machine for operating said rod; substantially as described.

167. In an adding-machine, the combination of a plurality of rows of keys, a plurality of swinging bails adjacent the respective rows of keys, each provided with a rearwardly-projecting pin and adapted to be depressed by the operation of any key in the corresponding row, a vertically-reciprocating cross-rod at the rear of the machine adapted to engage the pins of the depressed bails and lift them to normal position, and means for swinging said cross-rod rearward at will to permit it to rise at the depression of the cross-bar at the front of the machine without engaging the pins of the bails; substantially as described.

168. In an adding-machine, the combination of a plurality of rows of keys, a plurality of swinging bails adjacent the respective rows of keys, each provided with a rearwardly-projecting pin and adapted to be depressed by the operation of any key in the corresponding row, a vertically-reciprocating cross-rod at the rear of the machine adapted to engage the pins of the depressed bails and lift them to normal position, and a lever at the front of the machine connected to said cross-rod for swinging the same rearward at will to permit it to rise at the depression of the cross-bar at the front of the machine without engaging the pins of the bails; substantially as described.

169. In an adding-machine, the combination of a plurality of rows of keys, a plurality of spring-pressed shafts corresponding to said rows of keys and controlled in their movements in one direction thereby, a plurality of item-wheels fast upon said shafts, a plurality of totalizing-wheels loose upon said shafts and adapted to be slid into and out of engagement with the respective item-wheels, a swinging bail common to all of the totalizing-wheels for moving them into and out of engagement with the item-wheels, and a depressible cross-bar operating at its downward movement to cause the swinging bail to slide the totalizing-wheels into engagement with the item-wheels and to return the latter and their shafts to initial position, and at its upward movement to cause the bail to slide the totalizing-wheels to normal position again; substantially as described.

170. In an adding-machine, the combination of a plurality of rows of keys, a plurality of spring-pressed shafts corresponding to said rows of keys and controlled in their movements in one direction thereby, a plurality of item-wheels fast upon said shafts, a plurality of totalizing-wheels loose upon said shafts and adapted to be slid into and out of engagement with the item-wheels, an oscillatory cam operating when turned in opposite directions to swing said bail in opposite directions, a depressible cross-bar, a pawl carried thereby and operating at the downward movement of the bar to turn the cam in one direction, a second pawl carried by the bar and operating at the upward movement thereof to turn the cam in the reverse direction, and means operated by the depression of the cross-bar to restore the item-wheels and shafts to initial position; substantially as described.

171. In an adding-machine, the combination of a plurality of rows of keys, a plurality of spring-pressed shafts corresponding to said rows of keys and controlled in their movements in one direction thereby, a plurality of item-wheels fast upon said shafts, a plurality of totalizing-wheels loose upon said shafts and adapted to be slid into and out of engagement with the item-wheels, an oscillatory cam operating when turned in opposite directions to swing said bail in opposite directions, a depressible cross-bar, a pawl carried thereby and operating at the downward movement of the bar to turn the cam in one direction, a second pawl carried by the bar at the upward movement thereof to turn the cam in the reverse direction, and means for throwing one of said pawls out of operation at will to permit depression of the cross-bar without turning the cam and swinging the bail; substantially as described.

172. In an adding-machine, the combination of the shafts, normally controlled in their forward movements by the keys, the item-wheels fast upon said shafts and provided with the forwardly-extending projections, the disks loose upon the shafts in rear of the item-wheels and provided with the forwardly-projecting pins extending through holes in the item-wheels, the totalizing-wheels loose upon the shafts in front of the item-wheels and provided with the projections and holes coöperating with the projections and pins on the forward sides of the item-wheels, a swinging bail common to the disks carrying the pins and operating when swung rearward to slide said disks rearward and withdraw their pins into the item-wheels, a second swinging bail common to the totalizing-wheels and operating when swung rearward to slide said wheels into proximity to the item-wheels, a lever connected to both bails for swinging them rearward simultaneously, means operated by said lever for releasing all of the shafts and permitting them and their item-wheels to turn a maximum distance and cause the projections upon the item-wheels to pick up the totalizing-wheels and carry them to zero, and means for returning the item-wheels and shafts to initial position while leaving the totalizing-wheels at zero; substantially as described.

173. In an adding-machine, the combination of the totalizing-wheels provided with a plurality of holes and movable longitudinally on their axes, a plurality of spring-pressed carrying-levers provided with pins normally engaging holes in the respective totalizing-wheels, latches holding said levers from movement under the stress of their springs, projections upon the totalizing-wheels coöperating with said latches to cause a predetermined movement of each wheel to trip the latch holding in check the lever coöperating with the next higher wheel, and means for disengaging the wheels from the levers and holding the levers from movement while the wheels are so disengaged; substantially as described.

174. In an adding-machine, the combination of the totalizing-wheels provided with a plurality of holes and movable longitudinally on their axes, a plurality of spring-pressed carrying-levers provided with pins normally engaging holes in the respective totalizing-wheels, latches holding said levers from movement under the stress of their springs, projections upon the totalizing-wheels coöperating with said latches to cause a predetermined movement of each wheel to trip the latch holding in check the lever coöperating with the next higher wheel, and means for restoring the operated levers to initial position at the next operation of the machine, while the wheels are disengaged from the levers; substantially as described.

175. In an adding-machine, the combination of the totalizing-wheels, spring-pressed carrying-levers coöperating therewith, latches normally engaging said levers to hold them from movement, projections upon the wheels coöperating with the latches to disengage them from the levers, and supplemental latches carried by the main latches for holding the latter out of engagement with the levers after the projections upon the wheels have cleared and passed the latches; substantially as described.

176. In an adding-machine, the combination of the plurality of rows of keys, the plurality of spring-pressed shafts controlled by the respective rows of keys, the item-wheels fast upon said shafts, the totalizing-wheels loose thereon and movable into and out of engagement with the item-wheels, the spring-pressed carrying-levers provided with pins engaging holes in the totalizing-wheels, the latches for holding said levers from movement, the projections upon the totalizing-wheels for disengaging the latches from the levers, the depressible cross-bar for engaging the totalizing-wheels with the item-wheels and returning the latter to initial position, and at the same time disengaging the totalizing-wheels from the pins of the carrying-levers, a vertically-movable cross-rod operated by said bar for holding the carrying-levers in normal position during the disengagement of the totalizing-wheels from them, and for returning said levers to normal position after they have been moved therefrom by their springs; substantially as described.

177. In an adding-machine, the combination of the plurality of rows of keys, the plurality of spring-pressed shafts controlled by the respective rows of keys, the item-wheels fast upon said shafts, the totalizing-wheels loose thereon and movable into and out of engagement with the item-wheels, the spring-pressed carrying-levers provided with pins engaging holes in the totalizing-wheels, the latches for holding said levers from movement, the projections upon the totalizing-wheels for disengaging the latches from the levers, the supplemental latches for holding the main latches out of engagement with the carrying-levers after the projections upon the totalizing-wheels have passed and cleared the main latches, the depressible cross-bar for engaging the totalizing-wheels with the item-wheels and returning the latter to initial position, and at the same time disengaging the totalizing-wheels from the pins of the carrying-levers, and a vertically-movable cross-rod operated by said bar for holding the carrying-levers in normal position during the disengagement of the totalizing-wheels from them, and for returning said levers to normal position after they have been moved therefrom by their springs.

JASON C. LOTTERHAND.

Witnesses:
FREDERICK JAMES BARRETT,
CHARLES L. RAYNOR.